US 8,135,975 B2

(12) United States Patent
Olofsson

(10) Patent No.: US 8,135,975 B2
(45) Date of Patent: Mar. 13, 2012

(54) SOFTWARE PROGRAMMABLE TIMING ARCHITECTURE

(75) Inventor: Andreas D. Olofsson, Lexington, MA (US)

(73) Assignee: Analog Devices, Inc., Norwood, MA (US)

( * ) Notice: Subject to any disclaimer, the term of this patent is extended or adjusted under 35 U.S.C. 154(b) by 869 days.

(21) Appl. No.: 11/818,452

(22) Filed: Jun. 14, 2007

(65) Prior Publication Data
US 2008/0222441 A1  Sep. 11, 2008

Related U.S. Application Data

(60) Provisional application No. 60/906,000, filed on Mar. 9, 2007.

(51) Int. Cl.
*G06F 1/06* (2006.01)
(52) U.S. Cl. .................................. 713/400; 713/500
(58) Field of Classification Search .................. 713/400, 713/500
See application file for complete search history.

(56) References Cited

U.S. PATENT DOCUMENTS

| 3,671,875 A | 6/1972 | Pento |
| 3,671,945 A | 6/1972 | Maggio |
| 3,811,092 A | 5/1974 | Charbonnier |
| 3,889,104 A | 6/1975 | Smith |
| 3,974,484 A | 8/1976 | Struger et al. |
| 3,976,980 A | 8/1976 | Hertz |
| 4,025,868 A * | 5/1977 | Miki et al. .................. 324/76.39 |
| 4,257,044 A * | 3/1981 | Fukuoka ........................ 345/667 |
| 4,306,482 A | 12/1981 | Kashio |
| 4,380,802 A | 4/1983 | Segar et al. |
| 4,431,926 A | 2/1984 | Mayumi |
| 4,525,803 A * | 6/1985 | Vidalin et al. ......................... 1/1 |
| 4,587,415 A * | 5/1986 | Tsunekawa et al. ........... 250/204 |
| 4,644,469 A * | 2/1987 | Sumi .............................. 711/211 |
| 4,719,339 A * | 1/1988 | Mizuno .......................... 250/221 |
| 4,843,617 A * | 6/1989 | Marshall et al. ............... 375/371 |
| 5,027,315 A * | 6/1991 | Agrawal et al. .................. 326/38 |
| 5,127,010 A | 6/1992 | Satoh |
| 5,129,067 A * | 7/1992 | Johnson ......................... 712/213 |
| 5,134,484 A | 7/1992 | Willson |
| 5,202,844 A * | 4/1993 | Kamio et al. .................. 708/141 |
| 5,214,669 A * | 5/1993 | Zarembowitch ............... 375/130 |
| 5,220,215 A * | 6/1993 | Douglas et al. .................. 326/39 |
| 5,254,984 A | 10/1993 | Wakeland |
| 5,269,007 A * | 12/1993 | Hanawa et al. ............... 712/218 |
| 5,283,863 A * | 2/1994 | Guttag et al. .................. 715/799 |

(Continued)

FOREIGN PATENT DOCUMENTS
EP    0 715 252 A1    6/1996

OTHER PUBLICATIONS

Dixon, J.D. et al., "Programmable Instruction Cycle Time" IBM Technical Disclosure Bulletin, vol. 25, No. 5, p. 2705 (Oct. 1982).

(Continued)

*Primary Examiner* — Nitin Patel
*Assistant Examiner* — Zahid Choudhury
(74) *Attorney, Agent, or Firm* — Kenyon & Kenyon LLP

(57) ABSTRACT

A first output count is compared with first and second stored count values for generating an output event at a first node if the first Output count corresponds to the first or second stored count values.

15 Claims, 16 Drawing Sheets

U.S. PATENT DOCUMENTS

| | | | |
|---|---|---|---|
| 5,295,188 A | 3/1994 | Wilson et al. | |
| 5,313,644 A * | 5/1994 | Matsuo et al. | 712/228 |
| 5,337,415 A * | 8/1994 | DeLano et al. | 712/213 |
| 5,424,668 A | 6/1995 | Kohsaka | |
| 5,432,853 A | 7/1995 | Yamamoto | |
| 5,481,549 A | 1/1996 | Tokuyama | |
| 5,489,918 A | 2/1996 | Mosier | |
| 5,602,855 A * | 2/1997 | Whetsel | 714/727 |
| 5,751,984 A * | 5/1998 | Chang et al. | 712/216 |
| 5,838,896 A * | 11/1998 | Han | 714/23 |
| 5,850,533 A * | 12/1998 | Panwar et al. | 712/216 |
| 5,883,592 A | 3/1999 | Schepps et al. | |
| 5,898,853 A * | 4/1999 | Panwar et al. | 712/216 |
| 5,954,811 A | 9/1999 | Garde | |
| 5,954,816 A | 9/1999 | Tran et al. | |
| 5,968,196 A * | 10/1999 | Ramamurthy et al. | 714/727 |
| 5,974,500 A | 10/1999 | Maletsky et al. | |
| 6,026,141 A * | 2/2000 | Lo | 377/111 |
| 6,035,378 A * | 3/2000 | James | 711/147 |
| 6,097,721 A * | 8/2000 | Goody | 370/379 |
| 6,119,220 A | 9/2000 | Sato | |
| 6,285,310 B1 | 9/2001 | Michaelis et al. | |
| 6,378,022 B1 | 4/2002 | Moyer et al. | |
| 6,427,024 B1 * | 7/2002 | Bishop | 382/149 |
| 6,449,710 B1 * | 9/2002 | Isaman | 712/216 |
| 6,560,754 B1 * | 5/2003 | Hakewill et al. | 716/4 |
| 6,651,176 B1 * | 11/2003 | Soltis et al. | 713/300 |
| 6,841,983 B2 | 1/2005 | Thomas | |
| 6,856,527 B1 * | 2/2005 | Srinivasan et al. | 365/49.1 |
| 6,976,123 B2 | 12/2005 | Regev et al. | |
| 7,111,152 B1 * | 9/2006 | Cofler et al. | 712/216 |
| 7,171,631 B2 * | 1/2007 | Hakewill et al. | 716/1 |
| 7,266,005 B2 * | 9/2007 | Syed et al. | 365/49.17 |
| 7,281,119 B1 * | 10/2007 | Cofler et al. | 712/216 |
| 7,281,147 B2 * | 10/2007 | Soltis et al. | 713/322 |
| 7,318,145 B1 | 1/2008 | Stribaek et al. | |
| 7,418,580 B1 * | 8/2008 | Campbell et al. | 712/227 |
| 7,493,470 B1 * | 2/2009 | Cumplido et al. | 712/34 |
| 2002/0036765 A1 * | 3/2002 | McCaffrey et al. | 356/5.08 |
| 2003/0039135 A1 * | 2/2003 | Srinivasan et al. | 365/49 |
| 2003/0145216 A1 | 7/2003 | Nakane et al. | |
| 2003/0194003 A1 | 10/2003 | Wittig | |
| 2004/0078551 A1 | 4/2004 | Lichtenfels | |
| 2004/0128436 A1 | 7/2004 | Regev et al. | |
| 2004/0199745 A1 | 10/2004 | Schlansker et al. | |
| 2004/0264617 A1 | 12/2004 | Goko | |
| 2005/0099877 A1 | 5/2005 | Dybsetter et al. | |
| 2005/0114629 A1 | 5/2005 | Altman et al. | |
| 2005/0169353 A1 | 8/2005 | An et al. | |
| 2005/0172180 A1 * | 8/2005 | Damodaran et al. | 714/723 |
| 2005/0257030 A1 | 11/2005 | Langhammer | |
| 2006/0077275 A1 | 4/2006 | Pan et al. | |
| 2006/0123295 A1 | 6/2006 | Tanaka | |
| 2006/0152980 A1 | 7/2006 | Chiueh et al. | |
| 2006/0233005 A1 * | 10/2006 | Schaefer et al. | 365/1 |
| 2007/0107774 A1 * | 5/2007 | Jin et al. | 136/258 |
| 2007/0234150 A1 | 10/2007 | Jain et al. | |
| 2007/0292103 A1 * | 12/2007 | Candelore | 386/52 |
| 2009/0006800 A1 | 1/2009 | Bellofatto et al. | |
| 2009/0066790 A1 * | 3/2009 | Hammadou | 348/143 |
| 2009/0077109 A1 * | 3/2009 | Paris | 707/101 |
| 2010/0329673 A1 * | 12/2010 | Duan et al. | 398/45 |

OTHER PUBLICATIONS

"Selective Register Bit Set/Reset Mechanism" IBM Technical Disclosure Bulletin, vol. 30, No. 12, pp. 402-405 (May 1988).

Adelman, Y. et al., "600MHz DSP with 24Mb Embedded DRAM with an Enhanced Instruction Set for Wireless Communication," International Solid State Circuits Conference 2004.

Dixon, J.D. et al., "Programmable Instruction Cycle Time" IBM Technical Disclosure Bulletin, vol. 25, No. 5, p. 2705 (Oct. 1982).

Hennessy, J. et al., "Computer Architecture—A Quantitative Approach," Fourth Edition, Morgan Kauffman 2007.

Olofsson, A. et al., "A 4.32GOPS 1W General-Purpose DSP with an Enhanced Instruction Set for Wireless Communication," International Solid State Circuits Conferences 2002.

"Selective Register Bit Set/Reset Mechanism" IBM Technical Disclosure Bulletin, vol. 30, No. 12, pp. 402-405 (May 1988).

AD9920 12-Bit CCD Signal Processor with V-Driver and Precision Timing™ Generator.

Blackfm DSP Users Guide, http://www.analog.com/en/embedded-processing-dsp/blackfin/processors/manuals/resources/index.html.

TigerSharc DSP Users Guide, http://www.analog.com/en/embedded-processing-dsp/tigersharc/processors/manuals/resources/index.html.

* cited by examiner

- ◆ TOGGLE (COUNT, VECTOR)
  - Count is the value of the local counter at which to toggle the vector.
  - The vector is a set of 0's and 1's, There is one bit per output pin controlled. A one specifies a toggle, a zero specifies no action,
  - The (c) option clears the local counter after the instruction has occurred

- ◆ (C)
  - Option can be added to any instruction to clear the toggle counter

- ◆ LCx=0x0;;
  - Sets one of theTBD (possibly at least 3) loop counters to value specified.

- ◆ JUMP(ADDRESS) (S);;
  - Jumps to the address specified
  - The address is relative to the current PC.
  - The (S) option saves the PC in the RET register.

- ◆ IF NLCx, JUMP(ADDRESS) (S);;
  - Jumps to the address specified if the loop counter is equal to zero.
  - The address is relative to the current PC.
  - The loop counter is decremented after the instruction takes place.
  - The (S) option saves the PC in the RET register.

- ◆ IF LCx, JUMP(ADDRESS) (S);;
  - Jumps to the address specified if the loop counter is greater than zero.
  - The address is relative to the current PC.
  - The loop counter is decremented after the instruction takes place.
  - The (S) option saves the PC in the RET register.

- ◆ RETURN;;
  - JUMPS to PC stored in RET register.
  - Needed to make subroutines modular

- ◆ IDLE;;
  - Stops PC until next VD falling edge

- ◆ WAIT(COUNT);;
  - Do nothing for COUNT CLI cycles.

FIG. 14

- Fast vertical clocking routine:
- LC2=0x80000(c);;     //setting the loop counter and clearing the toggle counter
- TOGGLE(1,000001);;  ⎤
- TOGGLE(3,000010);;  ⎥
- TOGGLE(5,000100);;  ⎥ Vertical
- TOGGLE(7,001000);;  ⎥ pattern
- TOGGLE(11,010000);; ⎥
- TOGGLE(19,100000);; ⎦
- IF LC, JUMP(-6);;   //looping through vertical pattern for N cycles
- RETURN;;            //returning to main code

FIG. 15

- Single line readout routine:
- LC1=0x3(c);;          //setting loop counter for vertical shifts
- LC2=0x4096(c);;       //setting loop counter for horizontal shifts
- TOGGLE(1,0000001);;  ⎤
- TOGGLE(3,0000010);;  ⎥
- TOGGLE(5,0000100);;  ⎥ Vertical
- TOGGLE(7,0001000);;  ⎥ pattern
- TOGGLE(11,0110000);; ⎦
- IF LC1, JUMP(-6);;(c)  //repeat for N cycles
- TOGGLE(1,1000000);;    //Horizontal toggling for line readout
- IF LC2,JUMP(-1);;      //Repeat patterns(4096 pixels to read out for example)
- RETURN;;

FIG. 16

- ◆ FULL FRAME READOUT WITH SEVERAL REGIONS
  - LC=0x45;; //setting loop counter for number of times to go through loop
  - JUMP(ADDR0) (s);; //saving PC address and jumping to region0 routine
  - If LC,JUMP(-1);; //returning from routine, jump back to previous step for N cycles
  - LC=0x54;; //setting loop counter for next region.
  - JUMP(ADDR1) (s);; //region1 routine
  - if LC,JUMP(-1);;
  - LC=0x22;;
  - JUMP(ADDR2) (s);; //region2
  - If LC,JUMP(-1);;
  - LC=0x11;;
  - JUMP(ADDR3) (s);; //region3
  - If LC,JUMP(-1);;
  - LC=0x78;;
  - JUMP(ADDR4) (s);; //region4
  - If LC,JUMP(-1);;
  - LC=0x888;
  - JUMP(ADDR5) (s);; //region5

FIG. 17

| BIT[N-M] | BIT[M-6] | BIT[5-1] | Bit[0] |
|---|---|---|---|
| TOGGLE VECTOR | COUNT/ADDRESS | INST OPCODE | CLEAR |

FIG. 18

SOFTWARE PROGRAMMABLE TIMING ARCHITECTURE

This application claims the benefit under 35 U.S.C. §119 (e) of U.S. Provisional Application Ser. No. 60/906,000, filed on Mar. 9, 2007, the entire contents of which are incorporated herein by reference.

BACKGROUND

In a variety of applications, there is a need for generating timing pulses in an efficient manner. Such applications may include, for example, CCD timing interface chips, lens drivers, stepper motors, and display drivers. Such applications generally call for a very low cost and lower power solution, but need to run with fine clock cycle resolution on the timing pulse generation. Micro-controllers generally do not have the fine clock cycle or instruction width needed to generate a sufficient number of output pulses on a pixel by pixel basis.

SUMMARY

According to one aspect of the present invention, a circuit comprises a clock cycle counter circuit, a memory, and a clock cycle count comparison circuit. The clock cycle counter circuit is configured to produce an output count. The memory is configured to store at least first and second count values. The cycle count comparison circuit is configured to compare the output count with each of the first and second stored count values and to generate a particular type of output event at a node if the output count corresponds to either of the first and second stored count values.

According to another aspect, a method comprises steps of producing a output count in response to a clock signal, comparing the output count with each of first and second stored count values, and generating a particular type of output event at a node if the output count corresponds to either of first and second stored count values.

According to another aspect, a circuit comprises a digital pattern generator, a general purpose output controller, at least one memory element, and a selection circuit. The digital pattern generator is configured to generate a pattern of digital signals at M nodes. The general purpose output controller is configured to generate general purpose digital signals at N nodes. The at least one memory element is configured to store particular values for M outputs of the circuit corresponding to the M nodes of the digital pattern generator and for N outputs of the circuit corresponding to the N nodes of the general purpose output controller. The selection circuit is configured to select, independently for each of the M outputs of the circuit, whether the particular value stored in the at least one memory element or the corresponding output signal of the digital pattern generator is provided on that output, and is further configured to select, independently for each of the N outputs of the circuit, whether the standby value stored in the at least one memory element or the corresponding output signal of the general purpose output controller is provided on that output.

According to another aspect, a method for generating a digital signal pattern involves retrieving from memory an instruction comprising a first field representing a vector including a plurality of bits that are to be used to control states of signals on a corresponding plurality of nodes and a second field identifying a specified output state of a circuit that sequentially steps through a plurality of different output states in response to a clock signal. In response to determining that the output state of the circuit corresponds to the specified output state, the signals on the plurality of nodes are controlled in the manner specified by the corresponding ones of the plurality of bits in the first field.

According to another aspect, a method for generating a digital signal pattern involves retrieving from memory an instruction comprising a first field representing a vector including a plurality of bits that are to be used to control states of signals on a corresponding plurality of nodes and a second field identifying a criterion for determining an occasion on which the plurality of bits are to be controlled as specified by the vector. The instruction is executed so as to simultaneously control the signals on the plurality of nodes in the manner specified by the corresponding ones of the plurality of bits in the field in response to determining that the criterion has been met.

According to another aspect, apparatus for generating a digital signal pattern comprises a memory, a program sequencer, first and second circuits, and an event execution unit. The memory has stored therein a plurality of instructions that, when executed, cause a digital signal pattern to be generated on a plurality of nodes. The program sequencer is configured to control a sequence in which the plurality of instructions are retrieved from the memory and executed. The first circuit sequentially steps through a plurality of different output states in response to a clock signal. The second circuit identifies an output event when an output state of the first circuit corresponds to an output state identified by retrieved instructions of a particular type. The event execution unit controls states of signals on the plurality of nodes in a manner specified by the retrieved instructions of the particular type in response to the second circuit identifying an output event.

BRIEF DESCRIPTION OF THE DRAWINGS

FIG. 14 illustrates an example of a set of specialized instructions that may be executed by the DPP to generate timing signals;

FIG. 15 illustrates an example of a simple program that may be executed using the instructions of FIG. 14 to perform fast vertical clocking of an image sensor;

FIG. 16 illustrates an example of another simple program that may be executed by the DPP using the instructions of FIG. 14 to readout a single line of data from an image sensor;

FIG. 17 illustrates an example of a more complex program that may be executed by the DPP using the instructions of FIG. 14 to read out image sensor data from a full frame with several regions;

FIG. 18 shows an example of a program instruction configuration that may be used in the DPP.

DETAILED DESCRIPTION

Figure 1:
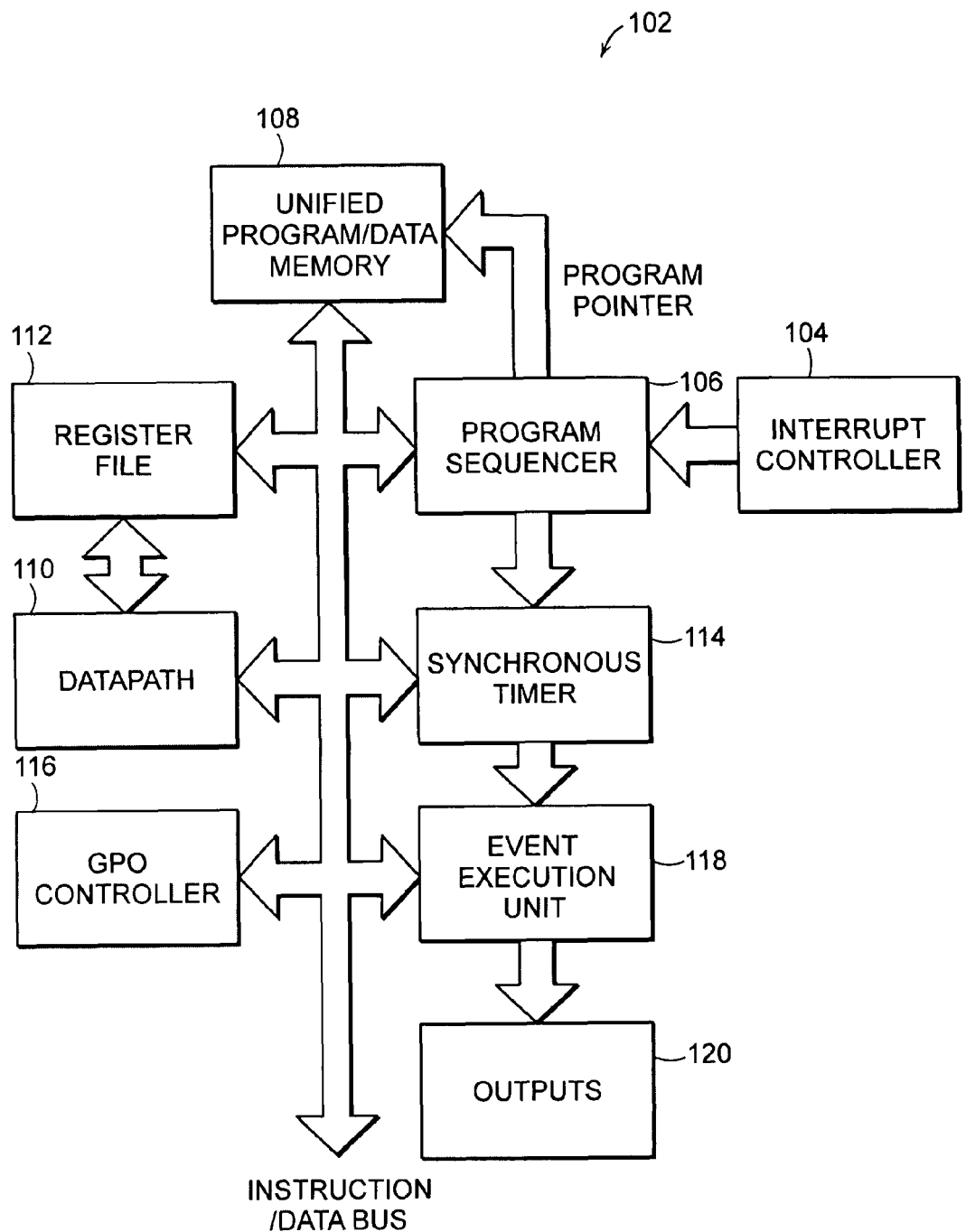
FIG. 1 is an architecture block diagram of a digital pattern processor (DPP) that embodies various aspects of the invention.

An illustrative embodiment of a digital pattern processor (DPP) is disclosed which comprises a reduced instruction set computer (RISC) with a unified program and data memory. In some embodiments, the DPP may have eight sixteen-bit general purpose registers used for data and pointer manipulation. To aid in timing generation applications, the DPP may also have a synchronous timer integrated into the program flow, two asynchronous counters for general purpose output (GPO) toggle creation, and a sixteen-input maskable interrupt controller.

As described below, in some embodiments, the architecture may have a compact and efficient instruction set, optimized for control and timing generation applications. The instruction set may, for example, be divided into the following four basic instruction types: (1) program flow instructions, (2) arithmetic instructions, (3) load/store instructions, and (4) pattern generation instructions. The program flow instructions may be used to control the flow of the program and form the framework for all software development on the DPP. The program flow instructions may thus provide support for looping, sub-routines, software interrupts, and branching. The arithmetic instructions may be used for general control flow, and for all control and data computation. The load/store instructions may be used for writing data to and reading data from the unified data/program memory, for saving and restoring registers in nested interrupt service routines, and for managing register data in nested sub routines. The pattern generation instructions may comprise an extended instruction set for generating a set of parallel output toggles very efficiently. The execution of these instructions may, for example, be controlled by an internal clock cycle counter that synchronizes the program fetch and execution with output pin toggling. In some embodiments, the DPP may have only a single state machine and all outputs of the DPP may be driven simultaneously.

In some embodiments, the DPP may be configured to fetch and execute one instruction per clock cycle, and may be parameter scalable to allow for easy optimization in different applications. In some embodiments, the DPP architecture may additionally or alternatively be used in conjunction with a generic serial interface and an interrupt controller to create a general purpose CPU subsystem.

As described below, a simple programming model may be employed that uses an intuitive assembly programming language, a unified register file for all variable manipulation, and a shallow, e.g., two cycle, pipeline. To aid in programming the part from external sources, all registers and memory locations may be memory mapped in a single coherent memory architecture. The applications in which the DPP may be used need not be determined by its hardware configuration; it may be programmable for virtually any application. The DPP may serve as a timing generator or other pattern signal generating device in any of a number of possible environments, and need not be configured specifically as an image sensor interface chip or for some other specific purpose. Examples of possible applications for a DPP such as that disclosed include CCD timing generation, lens driver controllers, LCD timing generators, ultra low power signal processing applications, mixed signal SOC micro-controllers, and motor control applications.

Because the DPP may be largely software based, it may be readily scaled for a particular application by employing a larger memory and/or employing a larger number of addresses. The DPP may also be significantly less expensive than logic-based architectures. In some embodiments, the DPP need not include vertical synchronization (VD) or horizontal synchronization (HD) counters inside the chip, thus allowing for the line and pixel count to be determined by the user so as to meet the specific needs of a particular image sensor when the DPP is used for such a purpose.

FIG. 1 is an architecture block diagram showing several operational units of an illustrative embodiment of a digital pattern processor (DPP) 102. In the example shown, the DPP 102 comprises an interrupt controller 104, a program sequencer 106, a memory 108, a datapath 110, a register file 112, a synchronous timer 114, a general purpose output (GPO) controller 116, and an event execution unit 118.

The interrupt controller 104 may, for example, process sixteen independent interrupts and exceptions to redirect the program pointer to one of the sixteen entries in an interrupt vector table (IVT), described below.

The program sequencer 106 may provide addresses to the program memory 108 and control the flow of the program being executed. The program sequencer 106 may further comprise at least one, and preferably three or more, loop counters to control loops in the executed program, as described below.

The memory 108 may comprise a unified program/data memory that can be accessed by read and write operations both from the DPP 102 and from an external host (not shown).

The register file 112 may, for example, comprise a general purpose register file with eight sixteen-bit registers. The datapath 110 may read values from the register file 112 and return results to the register file 112, and may thus be used for "load/store" instructions and "arithmetic" instructions.

The synchronous timer 114 may generate timing events during the program flow using specialized instructions. It may, for example, comprise a free-running sixteen-bit clock cycle counter (also referred to herein as a "toggle counter" or "synchronous timer" or "STIMER") which updates on every rising edge of the DPP clock. As explained in more detail below, an output event may be generated when the current instruction is a toggling instruction and the counter value specified in the toggling instruction matches the current value of the toggle counter. From the time that the toggle instruction is fetched to the time that the toggle event occurs, the DPP 102 may be kept in a hold state. The toggle match may, for example, cause an instruction-specified number of outputs 120 of the DPP 102 to toggle, and also cause the program pointer to advance to the next sequential program address.

The GPO controller 116 may permit programming of independent timing pulses on a set of general purpose output pins, for example, using two free-running thirty-two-bit cycle counters.

The event execution unit 118 may, for example, toggle the outputs 120 every time an event is generated by the programmable toggle instructions or by the GPO controller 116. The event execution unit 118 may also selectively enable outputs and manage standby polarities for all of the outputs 120 on a per pin basis.

Figure 2:
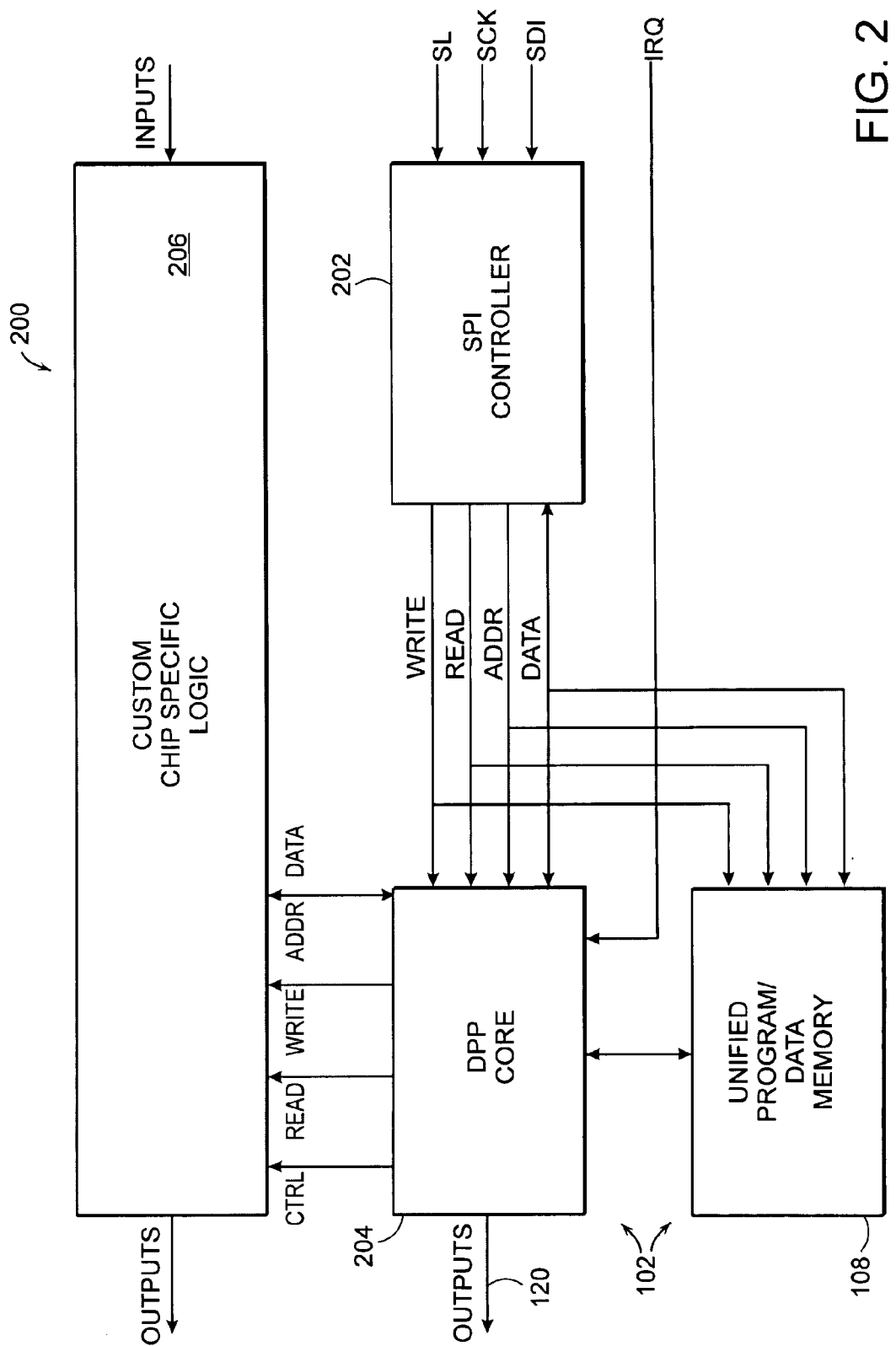
FIG. 2 shows an illustrative example of how the DPP may be employed in a typical micro-controller system on a chip.

FIG. 2 shows an illustrative example of how the DPP 102 may be employed in a typical micro-controller system-on-a-chip (SOC) 200. As shown, an SPI controller 202 may receive serial data from the chip interface and convert it to parallel read and write transactions for the on-chip memory 108 and for a DPP core 204 (which may, for example, comprise all of the other components of the DPP 102 shown in FIG. 1). In the example shown, the DPP core 204 is further connected to custom chip-specific logic 206 embedded on the chip 200, thus allowing the DPP 102 to directly control not only the outputs 120 of the chip 200 but also any embedded on-chip custom logic 206. By creating a single uniform memory architecture, the DPP core 204 may thus access any register or memory location, including the unified/program memory 108 and reserved memory space within the custom chip specific logic 206.

Figure 3:
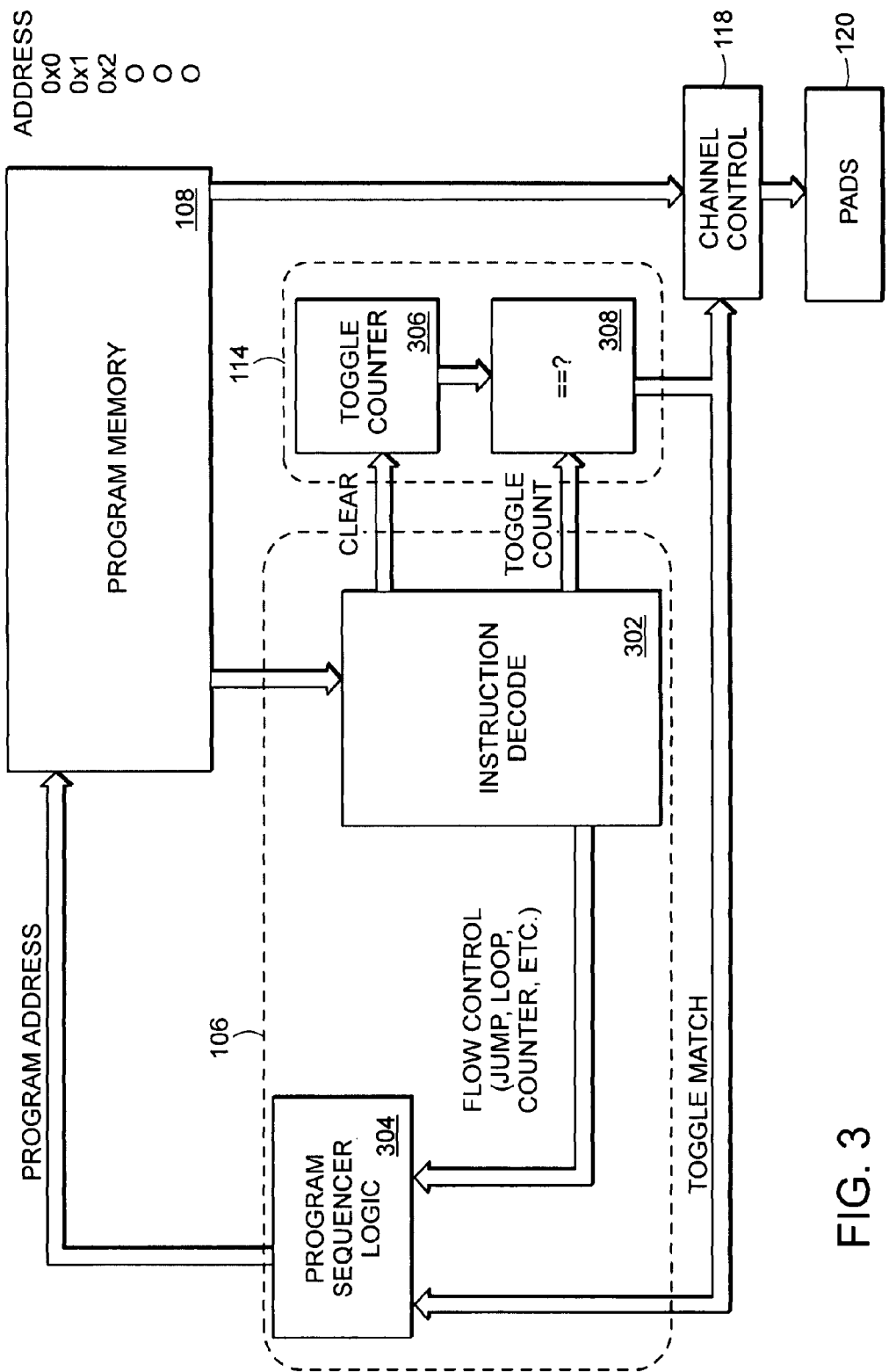
FIG. 3 is a functional block diagram illustrating various components of the DPP that may operate together to control toggling of its outputs.

FIG. 3 is a functional block diagram illustrating various components of the DPP 102 that may operate together to control toggling of the outputs 120. As shown, the program sequencer 106 may comprise an instruction decoding section 302 and a program sequencing logic section 304 that together are responsible for fetching instructions from the memory 108, decoding the fetched instructions, and controlling the synchronous timer 114 so as to appropriately generate toggle events. In the example shown, the synchronous timer 114 comprises a toggle counter 306 and a comparator 308. The comparator 308 may, for example, determine when the toggle counter 114 has reached a specified "toggle count" value. As noted above, the toggle counter 306 may, for example, comprise a sixteen-bit free-running clock cycle counter. An illustrative example of an execution flow that may be employed by these components to generate toggle pulses on the outputs 120 is discussed below in connection with FIG. 8.

Figure 4:
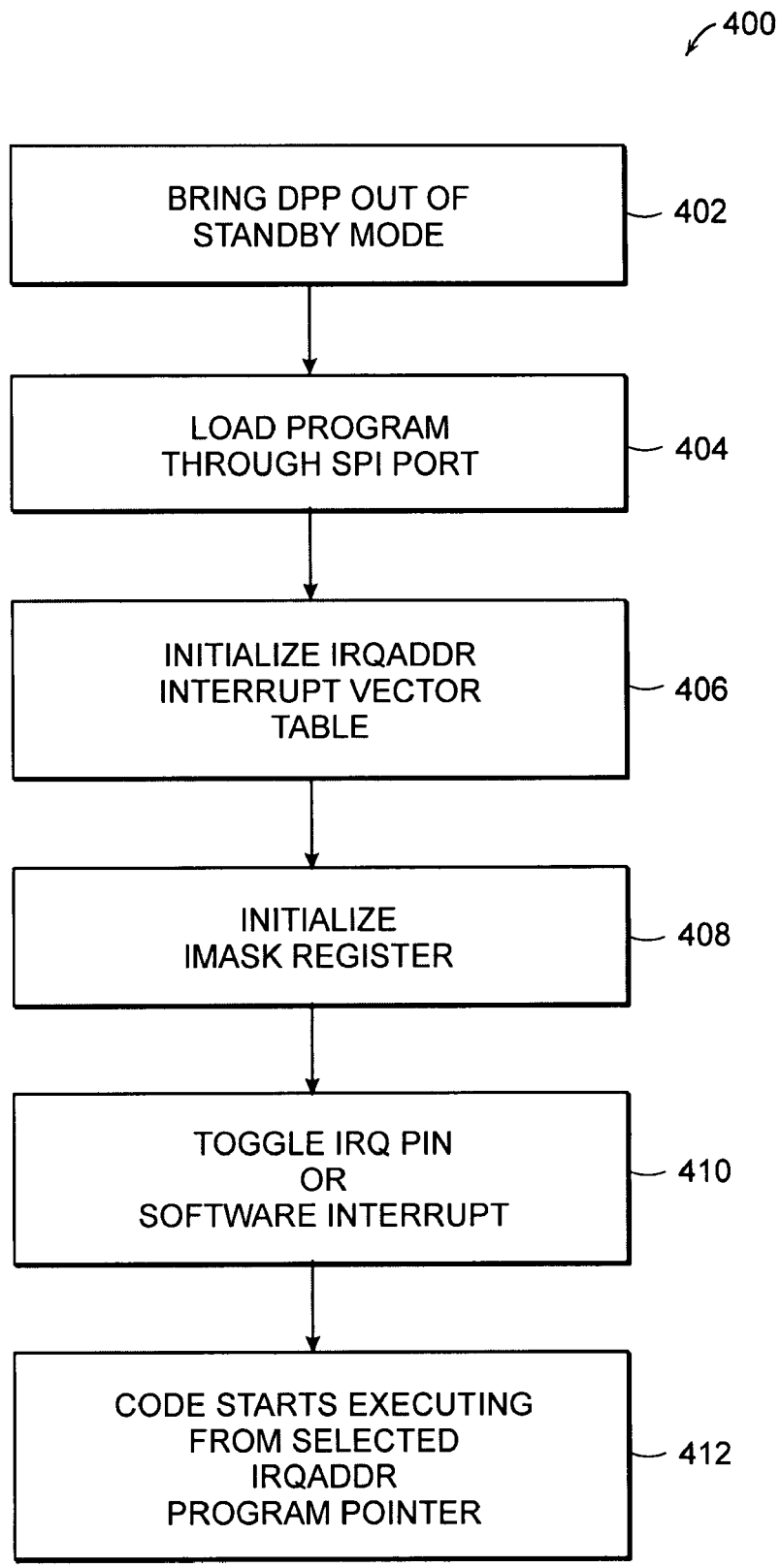
FIG. 4 shows an illustrative example of a program execution sequence that may be used by the DPP to load and execute code.

As noted above, the DPP 102 may execute a program stored, for example, in the on-chip program memory 108. FIG. 4 shows an illustrative example of a program execution sequence 400 that may be used by the DPP 102 to load and execute code. The start of the code execution may, for example, be initiated by an off-chip host processor, either by setting a hardware interrupt pin or by writing to an interrupt latch (ILAT) register, as described below. As shown, the sequence 400 may begin at a step 402, where the DPP 102 is brought out of standby mode. Next the sequence may proceed to a step 404, where an appropriate program may be loaded through an SPI port (e.g., via the SPI controller 202 shown in FIG. 2). Next, an IRQADDR interrupt vector table and an IMASK register (see Table 2 below) may be initialized at the steps 406 and 408, respectively. The sequence 400 may then proceed to a step 410, where an IRQ pin is toggled or a software interrupt occurs. Finally, the sequence 400 may begin executing code from the selected IRQADDR program pointer.

The DPP 102 may, for example, support two different data formats: sixteen bits signed data and sixteen bits unsigned data. For signed sixteen bit integer data, the most significant bit (MSB) and the fifteen least significant bits (LSBs) may, for example, represent values from "−32768" to "32767." For unsigned sixteen bit integer data, all bits may, for example, be interpreted as unsigned bits, providing a range of "0" to "65535." The sixteen bits signed data may, for example, be used for all arithmetic operations, while the sixteen bits unsigned data may be used for toggle instructions, load store instructions, and program flow instructions.

The following is a brief overview of the syntax convention used in the illustrative examples of the DPP assembly language that are described below. (1) The instruction syntax is case insensitive. Upper and lower case letters can be used and interchanged arbitrarily. For example R0 and r0 both refer to the register R0. The only exception to this convention is in defining and using macros, which are case sensitive. (2) White space can appear anywhere between legal assembly tokens and is removed during assembly pre processing. Tokens include numbers, register names, instructions, keywords, and identifiers. (3) <IMM16> refers to a sixteen bit immediate value provided by the instruction line. (4) {this|that} in the instruction syntax means that either "this" or "that" must be specified in the instruction line. (5) RD, RM, RS, RN specify any one of the eight general purpose registers. (6) MMR specifies one of the memory mapped registers described in the register tables. (7) A semi-colon must be used to terminate every instruction. (8) Labels are supported by using the format <LABEL:>. The label can be placed on its own line in the assembly code or on the same line as an instruction. It is illegal to place two labels on the same line. An example of legal use of labels is given below

```
LABEL1:
<code>
LABLE2:
<code>
```

(9) End of line comments use the double slash token ("//"). The double slash indicates that everything from the token until the end of the line should be ignored. (10) General comments begin with a ("/*") token and end with a ("*/") token and may extend over several lines. (11) Instruction options are specified at the end of the instruction, but before the semi-colon, surrounded by parentheses. For example, toggle_vector(0:V1) (c). (12) Assembler supported number format examples are given as follows:

```
Hexadecimal:   0xABCD,
Decimal:       33 and −33, and
Binary:        b#10010101.
```

Figure 5:
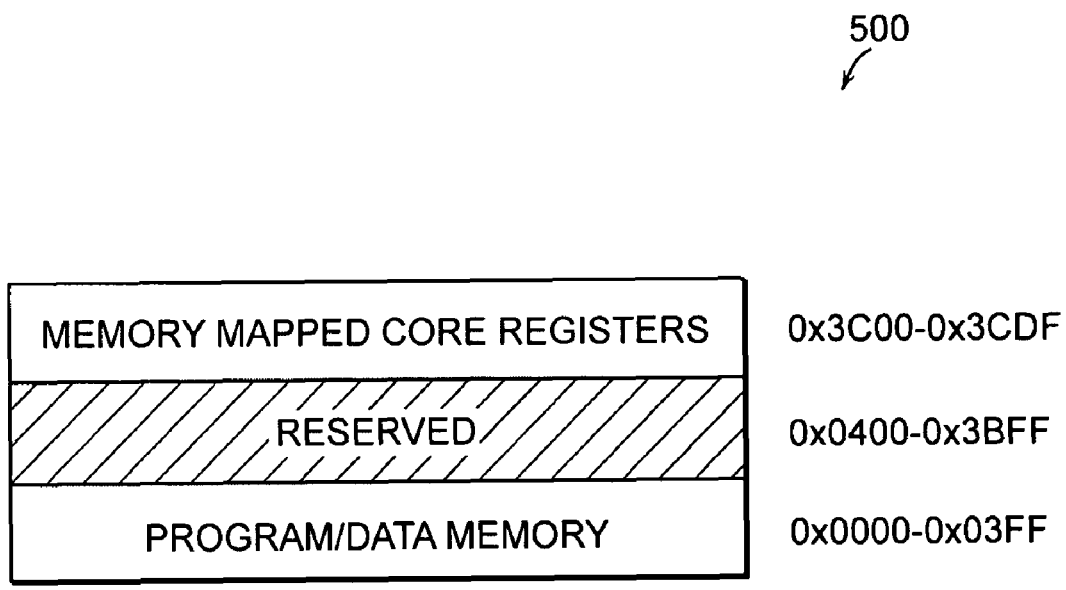
FIG. 5 shows an illustrative example of a core memory map for the DPP.

In some embodiments, the DPP may have a unified memory map for program instructions, data parameters, and all DPP related registers. The memory architecture may, for example, be sixteen-bit addressable, resulting in a maximum of "65536" address locations. The smallest addressable word in the architecture may, for example, be sixteen bits wide. FIG. 5 shows an illustrative example of a core memory map 500 for the DPP 102. In the example shown, the program memory is "1024" deep. In some embodiments, all DPP core registers may be memory mapped registers (MMR), which can be accessed by load-store instructions and external transactions. The absolute address locations shown in FIG. 5 may, for example, refer to the access of memory and registers from the DPP core itself. When accessing the memory mapped registers and memory from an external host, an offset may be added to the address values shown.

The DPP instructions may, for example, be N*sixteen-bits wide, and depend on the width of the software programmable output vector supported by the specific chip. In some embodiments, the instruction widths supported by the DPP core may, for example, be "32-128" in sixteen-bit increments. When loading the program into the program memory 108 through the SPI port at startup, instruction lines may be loaded sixteen bits at a time. Instructions may, for example, be fetched on even N*sixteen-bit boundaries, so all instructions may be stored in the program memory accordingly. Data parameters may be stored in memory as sixteen bit values at any memory location.

In some embodiments, all memory mapped registers (MMRs) may be accessed either by an external transaction or by a DPP generated load-store transaction. In addition, all MMRs may, for example, be loaded with sixteen-bit immediate values, through the immediate load instruction. Some registers may have additional functionality and access modes, which are described in the register tables below.

The DPP registers may, for example, be divided into five different groups: (1) General Purpose Registers, (2) Interrupt Control Registers, (3) Output Control Registers, (4) GPO Control Registers, and (5) a GPO Toggle Table.

The General Purpose Registers may, for example, comprise eight general purpose registers used for temporary storage of pointers, variables, and counters. They may, for instance, be used by all arithmetic instructions, load-store instructions, and toggle instructions. The Interrupt Control Registers may include ILAT, IMASK, and PMASK registers which control the execution and priority of interrupts and exceptions. A set of sixteen interrupt address registers may also form an interrupt vector table (IVT), which may be used to configure the start addresses of up to sixteen separate interrupt service routines (ISRs). The Output Control Registers may control the outputs of the DPP 102. All outputs of the DPP 102 may, for example, have a direct access bit, an enable bit, and a standby value bit that can be controlled by writing to the appropriate register. In some embodiments, some outputs may be controlled by the parallel toggle instructions, while others may be controlled by the GPO controller. In addition, in some embodiments, all outputs may be forced to explicit values by writing appropriate data to the OUTREG, OUTEN, and/or OUTSTANDBY registers. The GPO Control Registers may control the behavior of the free running GPO controller. They may, for example, control the wrap around values of the timers and validate the entries in a GPO toggle table. The GPO Toggle Table may, for example, comprise registers that provide a table of toggle values to which a pair of cycle counters, ATIMER0 and ATIMER1 (described below), are compared. Each toggle entry may, for instance, be validated by a valid bit in the ATIMER_VALID register.

Tables 1-5 below list examples of memory mapped registers that may be employed in the DPP 102. The tables contain the mnemonic name of register, the memory address of the register, access modes, reset states, and a description. In the access column, "R" refers to Read access and "W" refers to Write access. "NA" in all columns refers to non-applicable.

TABLE 1

Examples of General Purpose Registers

| NAME | ADDRESS | ACCESS | DEFAULT | DESCRIPTION |
| --- | --- | --- | --- | --- |
| R0 | 0x3C00 | R/W | None | General Purpose Register |
| R1 | 0x3C01 | R/W | None | General Purpose Register |
| R2 | 0x3C02 | R/W | None | General Purpose Register |
| R3 | 0x3C03 | R/W | None | General Purpose Register |
| R4 | 0x3C04 | R/W | None | General Purpose Register |
| R5 | 0x3C05 | R/W | None | General Purpose Register |
| R6 | 0x3C06 | R/W | None | General Purpose Register |
| R7 | 0x3C07 | R/W | None | General Purpose Register |
| PC | 0x3C08 | R/W | 0x0 | Instruction Fetch Pointer Register |
| RETS | 0x3C09 | R/W | 0x0 | Sub-routine return register. A CALL instruction writes the next sequential PC to the register. An RTS instruction copies the content of the RETS register to the PC register. |
| RETI | 0x3C0A | R/W | 0x0 | Interrupt return register. An interrupt event causes the next PC address to be written to the RETI. An RTI instruction copies the content of the RETI register to the PC register. |
| DPPSTANDBY | 0x3C0B | R/W | 0x0 | Controls the standby modes of the DPP. [0] = DPPEN [1] = GPOEN [2] = GPOOUTEN [3] = VECTOROUTEN [4] = STIMEREN [5] = ATIMER0EN [6] = ATIMER1EN |
| DPPSTATUS | 0x3C0C | R/W | 0x0 | Monitors status of DPP. [0] = Toggle instruction in process [1] = Reserved [2] = SPI transaction pending [3] = Reserved [4] = DPP in idle state [5] = DPP in single step mode [6] = Global Interrupt Disable Bit [7] = Reserved [8] = Skipped vector flag (sticky) [9] = STIMER wraparound (sticky) |

TABLE 1-continued

Examples of General Purpose Registers

| NAME | ADDRESS | ACCESS | DEFAULT | DESCRIPTION |
|---|---|---|---|---|
| | | | | [10] = ATIMER0 wraparound (sticky)<br>[11] = ATIMER1 wraparound (sticky)<br>[12] = Illegal opcode indication (sticky)<br>[13] = Indication of interrupt when not in idle (sticky)<br>[14] = Indication that SPI transaction was lost (sticky)<br>[15] = Reserved |
| ASTATUS | 0x3C0D | R/W | 0x0 | Monitors status of DPP datapath.<br>Register is updated by all arithmetic instructions.<br>[0] = Zero Flag<br>[1] = Negative Flag<br>[2] = Overflow Flag (sticky)<br>[15-3] = Reserved |
| DPPDEBUG | 0x3C0E | W | 0x0 | Controls hardware debugging of the DPP. All bits are self-reselling.<br>[0] = HALT: Halts the and places it in single step mode<br>[1] = SINGLESTEP: Advances PC to next instruction and remains in single step mode<br>[2] = RESUME: Brings DPP out of single step mode and resumes normal operation<br>[15:3] = Reserved |
| RESERVED | 0x3C0F | NA | NA | NA |
| STIMER | 0x3C10 | R/W | 0xFFFF | Pixel Counter register. The register can be cleared by toggle instructions and is updated automatically on every cycle when STIMER_EN is set. |
| STIMER_MAX | 0x3C11 | R/W | 0xFFFF | Max count for STIMER. The STIMER wraps around upon reaching STIMER_MAX. |
| RESERVED | 0x3C12-0x3C1F | NA | NA | NA |

TABLE 2

Examples of Interrupt Controller Registers

| NAME | ADDRESS | ACCESS | DEFAULT | DESCRIPTION |
|---|---|---|---|---|
| IMASK | 0x3C20 | R/W | 0x0000 | Controls masking of all interrupts. The order of the interrupt bits are:<br>[0] = Debug Emulation<br>[1] = Software Exception<br>[2] = Reserved<br>[15-3] = General Purpose Interrupts |
| PMASK | 0x3C21 | R/W | 0x0000 | Controls priority of interrupts being serviced. Bits in the register are set when interrupt service routine starts executing and are cleared by an RTI or RDS instruction. |
| ILAT | 0x3C22 | R/W | 0x0000 | Latches incoming interrupts. Bits in the register are set when rising edge interrupts are detected and are cleared at the start of the interrupt service routine. |
| ILATSET | 0x3C23 | W | NA | Alias that allows for setting specific bits of the ILAT. The operation performed is a read-modify-write operation. The new ILAT value is the OR function of the old ILAT and the value being written. |
| ILATCLR | 0x3C24 | W | NA | Alias that allows for clearing specific bits of the ILAT. The operation performed is a read-modify-write operation. The new ILAT value is the ANDNOT function of the old ILAT and the value being written. |
| IRQ0ADDR | 0x3C30 | W | None | Vector for IRQ0 |
| IRQ1ADDR | 0x3C31 | W | None | Vector for IRQ1 |
| IRQ2ADDR | 0x3C32 | W | None | Vector for IRQ2 |
| IRQ3ADDR | 0x3C33 | W | None | Vector for IRQ3 |

TABLE 2-continued

Examples of Interrupt Controller Registers

| NAME | ADDRESS | ACCESS | DEFAULT | DESCRIPTION |
|---|---|---|---|---|
| IRQ4ADDR | 0x3C34 | W | None | Vector for IRQ4 |
| IRQ5ADDR | 0x3C35 | W | None | Vector for IRQ5 |
| IRQ6ADDR | 0x3C36 | W | None | Vector for IRQ6 |
| IRQ7ADDR | 0x3C37 | W | None | Vector for IRQ7 |
| IRQ8ADDR | 0x3C38 | W | None | Vector for IRQ8 |
| IRQ9ADDR | 0x3C39 | W | None | Vector for IRQ9 |
| IRQ10ADDR | 0x3C3A | W | None | Vector for IRQ10 |
| IRQ11ADDR | 0x3C3B | W | None | Vector for IRQ11 |
| IRQ12ADDR | 0x3C3C | W | None | Vector for IRQ12 |
| IRQ13ADDR | 0x3C3D | W | None | Vector for IRQ13 |
| IRQ14ADDR | 0x3C3E | W | None | Vector for IRQ14 |
| IRQ15ADDR | 0x3C3F | W | None | Vector for IRQ15 |

TABLE 3

Examples of Output Control Registers

| NAME | ADDRESS | ACCESS | DEFAULT | DESCRIPTION |
|---|---|---|---|---|
| OUTREG0 | 0x3C40 | R/W | 0x0000 | Direct Access register for DPP outputs Bits[15:0] |
| OUTREG1 | 0x3C41 | R/W | 0x0000 | Direct Access register for DPP outputs Bits[31:16] |
| OUTREG2 | 0x3C42 | R/W | 0x0000 | Direct Access register for DPP outputs Bits[47:32] |
| OUTREG3 | 0x3C43 | R/W | 0x0000 | Direct Access register for DPP outputs Bits[63:48] |
| OUTREG4 | 0x3C44 | R/W | 0x0000 | Direct Access register for DPP outputs Bits[79:64] |
| OUTEN0 | 0x3C48 | R/W | 0x0000 | Enable register for DPP outputs Bits[15:0] |
| OUTEN1 | 0x3C49 | R/W | 0x0000 | Enable register for DPP outputs Bits[31:16] |
| OUTEN2 | 0x3C4A | R/W | 0x0000 | Enable register for DPP outputs Bits[47:32] |
| OUTEN3 | 0x3C4B | R/W | 0x0000 | Enable register for DPP outputs Bits[63:48] |
| OUTEN4 | 0x3C4C | R/W | 0x0000 | Enable register for DPP outputs Bits[79:64] |
| OUTSTANDBY0 | 0x3C50 | R/W | 0x0000 | Standby register for DPP outputs Bits[15:0] |
| OUTSTANDBY1 | 0x3C51 | R/W | 0x0000 | Standby register for DPP outputs Bits[31:16] |
| OUTSTANDBY2 | 0x3C52 | R/W | 0x0000 | Standby register for DPP outputs Bits[47:32] |
| OUTSTANDBY3 | 0x3C53 | R/W | 0x0000 | Standby register for DPP outputs Bits[63:48] |
| OUTSTANDBY4 | 0x3C54 | R/W | 0x0000 | Standby register for DPP outputs Bits[79:64] |

TABLE 4

Examples of GPO Controller Registers

| NAME | ADDRESS | ACCESS | DEFAULT | DESCRIPTION |
|---|---|---|---|---|
| ATIMER0_L0 | 0x3C60 | R/W | 0xFFFF | Low 16-bits of ATIMER0. The counter is updated every clock cycle when the GPO controller is enabled and ATIMER0 is enabled |
| ATIMER0_HI | 0x3C61 | R/W | 0xFFFF | High 16-bits of ATIMER0. |
| ATIMER0_MAX_LO | 0x3C62 | R/W | 0xFFFF | Low 16-bits of ATIMER0 max count. The ATIMER0 wraps around to zero when the max count is reached. |
| ATIMER0_MAX_HI | 0x3C63 | R/W | 0xFFFF | High 16-bits of ATIMER0 max count. |
| ATIMER1_L0 | 0x3C64 | R/W | 0xFFFF | Low 16-bits of ATIMER1. The counter is updated every clock cycle when the GPO controller is enabled and the ATIMER1 is enabled |

TABLE 4-continued

Examples of GPO Controller Registers

| NAME | ADDRESS | ACCESS | DEFAULT | DESCRIPTION |
|---|---|---|---|---|
| ATIMER1_HI | 0x3C65 | R/W | 0xFFFF | High 16-bits of ATIMER1. |
| ATIMER1_MAX_LO | 0x3C66 | R/W | 0xFFFF | Low 16-bits of ATIMER1 max count. The ATIMER1 wraps around to zero when the max count is reached. |
| ATIMER1_MAX_HI | 0x3C67 | R/W | 0xFFFF | High 16-bits of ATIMER1 max count. |
| ATIMER_VALID0 | 0x3C68 | R/W | 0x0000 | Enables GPO toggle entries<br>[3:0] = TOGGLE3-0 FOR GPO0<br>[7:4] = TOGGLE3-0 FOR GPO1<br>[11:8] = TOGGLE3-0 FOR GPO2<br>[15:12] = TOGGLE3-0 FOR GPO3 |
| ATIMER_VALID1 | 0x3C69 | R/W | 0x0000 | Enables GPO toggle entries<br>[3:0] = TOGGLE3-0 FOR GPO4<br>[7:4] = TOGGLE3-0 FOR GPO5<br>[11:8] = TOGGLE3-0 FOR GPO6<br>[15:12] = TOGGLE3-0 FOR GPO7 |
| ATIMER_VALID2 | 0x3C6A | R/W | 0x0000 | Enables GPO toggle entries<br>[3:0] = TOGGLE3-0 FOR GPO8<br>[7:4] = TOGGLE3-0 FOR GPO9<br>[11:8] = TOGGLE3-0 FOR GPO10<br>[15:12] = TOGGLE3-0 FOR GPO11 |
| ATIMER_VALID3 | 0x3C6B | R/W | 0x0000 | Enables GPO toggle entries<br>[3:0] = TOGGLE3-0 FOR GPO12<br>[7:4] = TOGGLE3-0 FOR GPO13<br>[11:8] = TOGGLE3-0 FOR GPO14<br>[15:12] = TOGGLE3-0 FOR GPO15 |
| ATIMER_STICKY0 | 0x3C6C | R/W | 0x0000 | Sticky enable GPO toggle entries<br>[3:0] = TOGGLE3-0 FOR GPO0<br>[7:4] = TOGGLE3-0 FOR GPO1<br>[11:8] = TOGGLE3-0 FOR GPO2<br>[15:12] = TOGGLE3-0 FOR GPO3 |
| ATIMER_STICKY1 | 0x3C6D | R/W | 0x0000 | Sticky enable GPO toggle entries<br>[3:0] = TOGGLE3-0 FOR GPO4<br>[7:4] = TOGGLE3-0 FOR GPO5<br>[11:8] = TOGGLE3-0 FOR GPO6<br>[15:12] = TOGGLE3-0 FOR GPO7 |
| ATIMER_STICKY2 | 0x3C6E | R/W | 0x0000 | Sticky enable GPO toggle entries.<br>[3:0] = TOGGLE3-0 FOR GPO8<br>[7:4] = TOGGLE3-0 FOR GPO9<br>[11:8] = TOGGLE3-0 FOR GPO10<br>[15:12] = TOGGLE3-0 FOR GPO11 |
| ATIMER_STICKY3 | 0x3C6F | R/W | 0x0000 | Sticky enable GPO toggle entries.<br>[3:0] = TOGGLE3-0 FOR GPO12<br>[7:4] = TOGGLE3-0 FOR GPO13<br>[11:8] = TOGGLE3-0 FOR GPO14<br>[15:12] = TOGGLE3-0 FOR GPO15 |
| ATIMER_SEL | 0x3C70 | R/W | 0x0000 | Selects ATIMER0 or ATIMER1 for each GPO pin.<br>A one specifies that ATIMER1 is used for comparisons.<br>[0] = GPO0<br>[1] = GPO1<br>[2] = GPO2<br>[3] = GPO3<br>[4] = GPO4<br>[5] = GPO5<br>[6] = GPO6<br>[7] = GPO7<br>[8] = GPO8<br>[9] = GPO9<br>[10] = GPO10<br>[15:11] = RESERVED |

TABLE 5

Example of a GPO Toggle Entry Table
(The complete table could continue in the same fashion for all remaining GPO pins)

| NAME | ADDRESS | ACCESS | DEFAULT | DESCRIPTION |
| --- | --- | --- | --- | --- |
| GPO0_TOG0_LO | 0x3C80 | W | none | Low 16 bits of toggle0 entry for GPO0 |
| GPO0_TOG0_HI | 0x3C81 | W | none | High 16 bits of toggle0 entry for GPO0 |
| GPO0_TOG1_LO | 0x3C82 | W | none | Low 16 bits of toggle1entry for GPO0 |
| GPO0_TOG1_HI | 0x3C83 | W | none | High 16 bits of toggle1entry for GPO0 |
| GPO0_TOG2_LO | 0x3C84 | W | none | Low 16 bits of toggle2entry for GPO0 |
| GPO0_TOG2_HI | 0x3C85 | W | none | High 16 bits of toggle2entry for GPO0 |
| GPO0_TOG3LO | 0x3C86 | W | none | Low 16 bits of toggle3entry for GPO0 |
| GPO0_TOG3HI | 0x3C87 | W | none | High 16 bits of toggle3entry for GPO0 |
| GPO1_TOG0_LO | 0x3C88 | W | none | Low 16 bits of toggle0 entry for GPO1 |
| GPO1_TOG0_HI | 0x3C89 | W | none | High 16 bits of toggle0 entry for GPO1 |
| GPO1_TOG1_LO | 0x3C8A | W | none | Low 16 bits of toggle1 entry for GPO1 |
| GPO1_TOG1_HI | 0x3C8B | W | none | High 16 bits of toggle1 entry for GPO1 |
| GPO1_TOG2_LO | 0x3C8C | W | none | Low 16 bits of toggle2 entry for GPO1 |
| GPO1_TOG2_HI | 0x3C8D | W | none | High 16 bits of toggle2 entry for GPO1 |
| GPO1_TOG3LO | 0x3C8E | W | none | Low 16 bits of toggle3 entry for GPO1 |
| GPO1_TOG3HI | 0x3C8F | W | none | High 16 bits of toggle3 entry for GPO1 |

Program Sequencer

Figure 6:
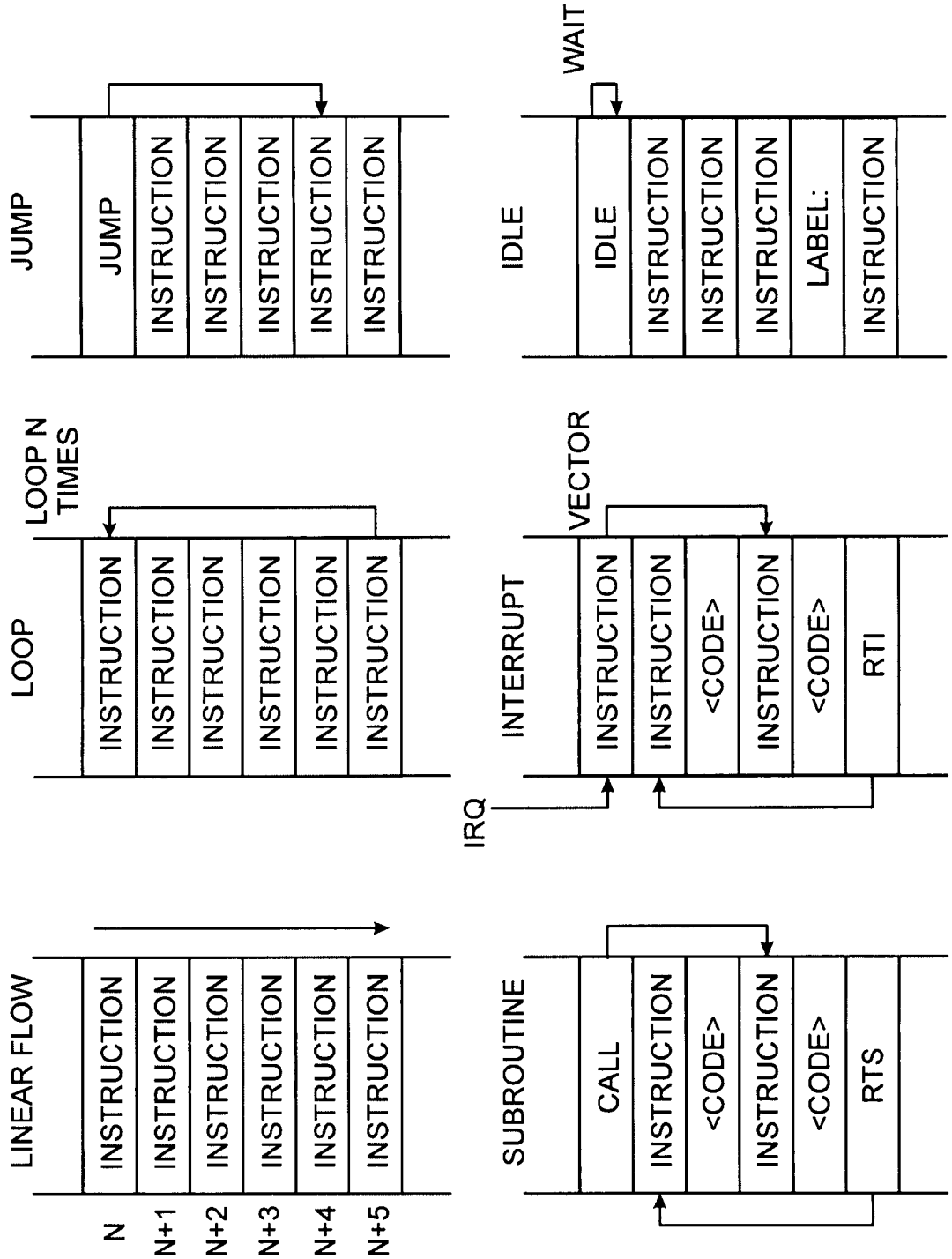
FIG. 6 shows several examples of program sequence structures that may be supported by the DPP.

As noted above, the program sequencer 106 of the DPP 102 may control the flow of the program execution. The program sequencer 106 may, for example, generate a fetch address for the program memory, receive the instruction from memory, decode the instruction, send control signals to the rest of the DPP units, and finally generate the next fetch address to be sent to the program memory. The program flow in the DPP may be typically linear, with the processor executing program instructions sequentially. The linear flow may, however, vary occasionally when the program uses non-sequential program structures, such as those illustrated in FIG. 6.

As shown, examples of such non-sequential program structures that may be supported by the DPP 102 include "loops," "subroutines," "jumps," "interrupts and exceptions," and "idle." For loops, one sequence of instructions may, for example, execute several times using general purpose registers, arithmetic instructions, and conditional branching instructions. For subroutines, the processor may, for example, temporarily interrupt sequential flow to execute instructions from another part of memory. After completing the subroutine, the program flow may return to the instruction following the CALL instruction used execute the subroutine program. For jumps, program flow may, for example, transfer permanently to another part of memory. For interrupts and exceptions, a runtime event or instruction may, for example, trigger the execution of a subroutine. The program may, for instance, jump to the address specified in the interrupt vector table (IVT). For idle structures, an instruction may, for example, cause the processor to stop operating and hold its current state until an interrupt occurs. Then the processor may service the interrupt and continue normal execution.

The program sequencer 106 may manage execution of these program structures by selecting the address of the next instruction to execute. For example, the program pointer, also referred to as the program counter (PC), may couple with the RETS and RETI registers, which store return addresses for subroutines and interrupt service routines. In some embodiments, all addresses generated by the sequencer may, for example, be sixteen-bit memory instruction addresses. The program sequencer 106 may also support both conditional and non-conditional branching.

Branches

A branch may occur, for example, when a JUMP or CALL instruction begins execution at a new location other than the next sequential address. A JUMP or CALL instruction may, for example, transfer program flow to another memory location. In some embodiments, the difference between a JUMP and a CALL may be that a CALL may automatically write the next sequential program address into the RETS register. This push operation may make the address available for the CALL instruction's matching return instruction (RTS), allowing easy return from the subroutine. An RTS instruction may, for example, copy the content of the RETS register to the PC register and fetch a new instruction from that address.

In some embodiments, a JUMP instruction may be conditional, depending on the arithmetic flags set in the ASTATUS register (see Table 1 above) and the conditional options used by the instruction. The ASTATUS register may, for example, be updated by every arithmetic instruction. In certain embodiments, if no condition is specified, the branch may always be taken. As an example, the supported conditions in the conditional instruction, if {!}<COND>, JUMP(<IMM16>), may comprise:

EQ: Equal to Zero. Evaluates as true if the zero flag in the ASTATUS register is 1 and the negative flag in the ASTATUS register is 0.

LT: Less than Zero. Evaluates as true if the zero flag in the ASTATUS register is 0 and the negative flag in the ASTATUS register is 1.

LTE: Less than or Equal to Zero. Evaluates as true if the zero or negative flag in the ASTATUS register is 1.

!: Indicates that the condition should evaluate to false for the branch to be taken.

In some embodiments, all types of JUMP and CALL instructions may be executed using absolute sixteen-bit addresses.

Subroutines

Subroutines may be code sequences that are constructed with the CALL and RTS instructions. Assuming that a stack pointer has been initialized properly, a typical subroutine call may, for example, include the following steps: (1) pass a parameter to a register used as an input by the subroutine, (2) execute the CALL instruction, (3) push all registers modified by the function onto the stack, (4) execute the body of subroutine, (5) pop the values from the stack back to their original registers, (6) execute the RTS instruction, and (7) Return to next sequential instruction following original CALL instruction.

An example of the sub-routine definition and usage is given below.

```
/* parent function */
/*R0=0*/
/*R1 used as stack pointer*/
/*R4 used as input/output parameter*/
/*R6 used as temporary register*/
R4 = 0x1234;            /*pass a parameter */
CALL(MYFUNCTION);       /*execute subroutine*/
[R0+RESULT0] = R4;      /*save return value to memory location
                          RESULT0 */
JUMP(SOMEWHERE);        /*jump to elsewhere in code*/
MYFUNCTION:             /*subroutine label */
[--R1]=R6;              /*pushing R6 register onto stack since this
register is modified*/
R6=[R0+DATA0];          /*loading data0 from data memory to R6*/
R4=R4+R6;               /*Adding R6 to register passed*/
R6=[R1++];              /*popping R6 from stack to restore state on
exit from subroutine*/
RTS;                    /* return from subroutine */
```

In addition to redirecting the program flow to the MYFUNCTION subroutine above, a CALL instruction may also write the return address into the RETS register automatically. The RETS register may hold the address where program execution is to resume after the RTS instruction executes. In the above example, this is the location that holds the "[R0+ RESULT0]=R4;" instruction. The return address need not be passed to the stack in the background. Rather, the RETS register may function as single-entry hardware stack. This scheme may thus enable "leaf functions" (subroutines that do not contain further CALL instructions) to execute with less possible overhead, as no bus transfers need to be performed. If a subroutine calls other subroutines, it may temporarily push the content of the RETS and other registers used by the master subroutine onto the stack.

In some embodiments, the push and pop instructions may be omitted from the subroutines by instituting a programming methodology in which certain registers are dedicated as temporary variables and subroutine arguments. For instance, if the R6 register in the above example did not have to be restored for the main code, the push and pop instructions could have been omitted.

Standby Register (DPPSTANDBY)

The DPPSTANDBY register (see Table 1 above) may, for example, selectively enable all major features of the DPP 102. In some embodiments, all functionality may be turned off (0x0000) at reset by default, and before any DPP related operation can take place, the appropriate functions may be enabled in the DPPSTANDBY register. To enable a specific function, the corresponding bit may be set to "1" in the standby register. In some embodiments, the functionality of the individual bits of the DPPSTANDBY may, for example, be as follows:

[0]→DPPEN: Enable bit for the DPP. When the bit is cleared, only the DPPSTANDBY register is being clocked. In order to enable the program sequencer and the rest of the DPP, the DPPEN bit must be set.

[1]→GPOEN: Enable bit for the GPO controller. The GPO controller contains the functionality of the ATIMER* registers and GPO* registers. When the bit is cleared, the clock to the GPO controller is completely disabled. As a result, ATIMER0 and ATIMER1 are not updated on the rising edge of the clock and the registers are unresponsive to register write transactions.

[2]→GPOOUTEN: Enable bit for the GPO outputs from the DPP. When this bit is cleared, the GPO output levels are taken from the OUTSTANDBY register. When the bit is set, the GPO driven output levels are taken from the OUTREG register. This bit functions as an override bit for the OUTEN registers. The bit can be used to quickly enable and disable all GPO outputs in one clock cycle.

[3]→VECTOROUTEN: Enable bit for the vector outputs from the DPP. When this bit is cleared, the vector output levels are taken from the OUTSTANDBY register. When the bit is set, the vector driven output levels are taken from the OUTREG register. This bit functions as an override bit for the OUTEN registers. The bit can be used to quickly enable and disable all vector driven outputs in one clock cycle.

[4]→STIMEREN: Enable bit for the synchronous timer. The timer updates on every rising edge of the DPP clock as long as the STIMEREN bit is set. The STIMER can be stopped with the STIMEREN bit to reduce power and to reduce noise.

[5]→ATIMER0EN: Enable bit for ATIMER0. The timer updates on every rising edge of the DPP clock as long as the ATIMER0EN bit is set and the GPOEN bit is set. The ATIMER0 can thus be stopped selectively to reduce power and reduce noise.

[6]→ATIMER1EN: Enable bit for ATIMER1. The timer updates on every rising edge of the DPP clock as long as the ATIMER1EN bit is set and the GPOEN bit is set. The ATIMER1 can thus be stopped selectively to reduce power and noise.

Program Flow Status Register (DPPSTATUS)

The DPPSTATUS register (see Table 1 above) may, for example, contain information regarding the present execution status of different units of the DPP 102 and may be used to debug run away code and faulty hardware configurations. The eight least significant bits (LSBs) of the DPPSTATUS register may, for instance, contain status flags that are updated on every clock cycle or on every use of certain specific instructions or transactions. The eight most significant bits (MSBs) may, for example, be sticky bits, which, once set, can be reset only by a reset event or by explicitly writing to the DPPSTATUS register. In some embodiments, the functionality of the individual DPPSTATUS bits may, for example, be as follows:

Immediate Bits:

[0]→TOGGLE_PENDING: A set bit indicates that a toggle instruction has been executed and the DPP is waiting for a toggle count match to continue the program execution.

[2]→EXT_TRANS_PENDING: An external transaction tried to access the memory but was delayed in a one stage transaction buffer until the DPP stops accessing the memory.

[4]→IDLE: The DPP is currently in an idle state awaiting an external interrupt signal to start code execution.

[5]→SINGLESTEP_MODE: The DPP is in single step mode and will advance one instruction at a time. The mode is reached by inserting a breakpoint instruction in the program or by writing to the DPPDEBUG register.

Sticky Bits:

[8]→SKIPPED_MATCH: Indicates that a toggle instruction was executed, for which the toggle count value was less than the STIMER at the time of the initial execution. This is generally an undesirable situation and is thus flagged.

[9]→STIMER_WRAPAROUND: Indicates that the STIMER wrapped around from STIMER_MAX to zero.

[10]→ATIMER0_WRAPAROUND: Indicates that the ATIMER0 wrapped around from ATIMER0_MAX to zero.

[11]→ATIMER1_WRAPAROUND: Indicates that the ATIMER1 wrapped around from ATIMER1_MAX to zero.

[12]→ILLEGAL_OPCODE: Indicates that an illegal opcode was entered. This bit can be used for software debugging to indicate execution of an uninitialized program memory or a jump to a data section of the memory.

[13]→INTERRUPT: Indicates that the normal program flow was interrupted by an external interrupt while the DPP was running. In very timing exact applications, this is generally an undesirable situation as it would indicate that the foreground process or the interrupt process would get delayed. For most applications, this bit can be ignored since DPP supports nested as well as non-nested interrupts, and the correct program flow order is guaranteed under all interrupt sequences.

[14]→EXT_LOST: Indicates that an external transaction was lost. If an external transaction and an internal transaction arrive at the memory simultaneously, the DPP transaction has preference. The external transaction then gets latched into a one stage buffer until the DPP stops accessing the memory. If a second external transaction arrives before the first transaction has been completed, it overwrites the first instruction in the transaction buffer, causing the first transaction to be permanently lost.

Bits 15, 7, 6, 3, 1 of the DPPSTATUS may be reserved and can thus be ignored for the purposes of this description.

Arithmetic Status Register (ASTATUS)

The ASTATUS register (see Table 1 above) may, for example, monitor the result of the most recently executed arithmetic instruction. In some embodiments, for example, the following flags may be used by the conditional branch instruction, and may also be used for general program monitoring.

[0]→ZERO_FLAG: This bit is set when all bits of the arithmetic instruction result are zero.

[1]→NEGATIVE_FLAG: This bit is set when the most significant bit of the arithmetic instruction result is 1.

[2]→OVERFLOW_FLAG: This bit is set when the most significant bit of the two input operands are the same and the most significant bit of the result is different from the that of the two input operands. Overflow could occur in addition when adding two large positive numbers or adding two large negative numbers, but could not happen when adding a positive and negative number.

Output Control Register (OUTREGx, OUTENx, OUTSTANDBYx)

The output control registers (see table 3 above) may, for example, directly control the outputs of the DPP 102. Each DPP output may, for instance, be controlled by one bit in each of the OUTREG, OUTEN, and OUTSTANDBY registers. In some embodiments, there may, for example, be five each of the OUTREG, OUTEN, and OUTSTANDBY registers, each sixteen-bits wide and controlling sixteen outputs. Outputs from the GPO controller and the toggle instructions may, for instance, be combined to form a single wide output vector that may be controlled by the output control registers. The GPO driven outputs may, for example, be situated above the MSB of the vector driven outputs in the final output vector. For example, if there are fifty-seven pins driven by the programmable vector toggle instructions and eleven pins driven by the GPO controller, the DPP output mapping may be:

Bits 0 to 56 are driven by the programmable vector toggle instructions

Bits 57 to 67 are driven by the GPO controller

In the code example below, bit zero and bit fifty-seven would be enabled, while keeping all other outputs placed in a standby state.

OUTEN0=0x0001; //Bits 15-0
OUTEN3=0x0400; //Bits 48-63

Figure 7:
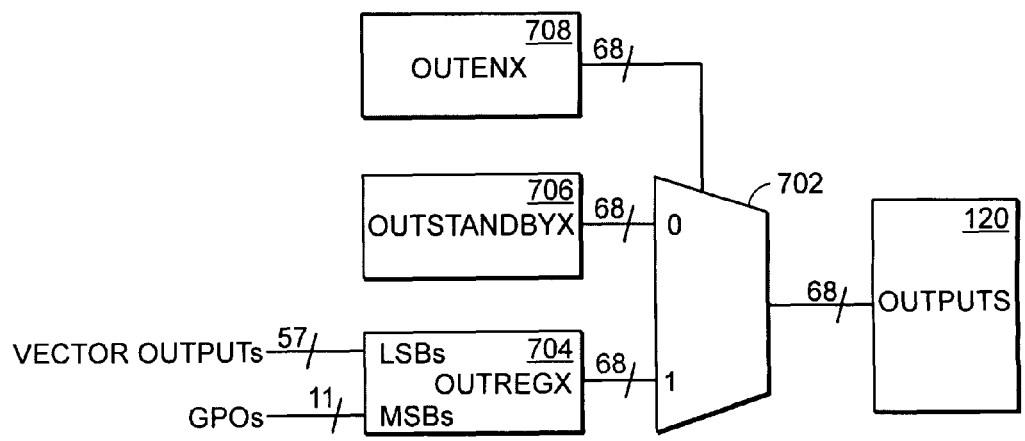
FIG. 7 shows an example of a hardware control mechanism that may by used to enable and disable the outputs of the DPP on a pin by pin basis.

FIG. 7 shows an example of a hardware control mechanism including a multiplexer 702 that may by used in conjunction with the OUTREG register 704, the OUTSTANDBY register 706, and the OUTEN register 708 to enable and disable the outputs 120 on a pin by pin basis. In some embodiments, all of the outputs 120 may, by default, wake up in a disabled state with the default standby polarity set to zero. In the example of FIG. 7, each of the sixty-eight bits of the OUTENX register 708 controls whether a corresponding bit of the OUTSTANDBY register 706 or a corresponding bit of the OUTREGX register 704 is provided on a corresponding one of the outputs 120. Thus, by writing appropriate values to the OUTENX register 708, selected subsets of either or both of the vector outputs and the GPO driven outputs may be provided on the outputs 120, with the states of the other outputs being set based upon the corresponding bits of the OUTSTANDBYX register 706. This arrangement may therefore allow an additional level of flexibility in controlling the content of the outputs 120 in certain circumstances, for example, in embodiments where it may be relatively difficult to reconfigure the logic that controls the vector toggle instructions and/or the logic that controls the GPO outputs.

Synchronous Timing Engine

As discussed above in connection with FIG. 3, the synchronous timer 114 may, for example, comprise a free running clock cycle counter, e.g., toggle counter 306, and a cycle counter comparator 308 that may be integrated into the program sequencer 106. When the DPP 102 encounters a special toggling instruction, the DPP program counter may, for example, be stalled until the toggle counter 306 reaches the value specified in the toggling instruction line. When a match is found, an indication may be sent to the DPP's output event execution unit 118, and the outputs 120 may be toggled according to the type of toggling instruction and the data bits set in the instruction line.

The DPP architecture may, for example, support the following instruction types: (1) TOGGLE_VECTOR and (2) FORCE_VECTOR. In some embodiments, the DPP 102 may advantageously support a very wide instruction word, so every one of the software driven outputs can be toggled or forced to particular values with a single instruction. After the outputs have been toggled or forced, the program counter may advance to the next sequential instruction line, and the program fetching may resume to normal operation.

Figure 8:
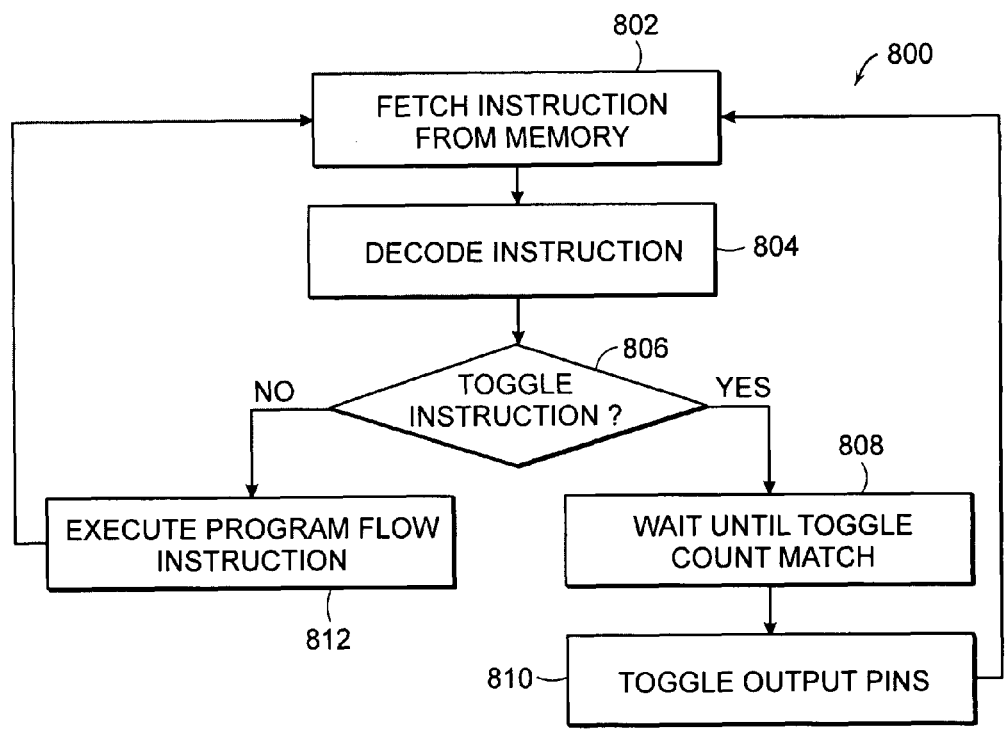
FIG. 8 is a flowchart illustrating an example of an execution flow that may be used to generate toggle pulses on the outputs of the DPP.

FIG. 8 is a flowchart illustrating an example of an execution flow 800 that may be used to generate toggle pulses on the outputs 120. As shown, at steps 802 and 804, an instruction is fetched from the program memory 108 and decoded for execution. If, at a step 806, it is determined that the instruction is a "toggle" instruction, then the flow 800 proceeds to a step 808, where it waits until the comparator 308 has determined that the toggle counter 306 has reached the "toggle count" specified in the instruction. Once the toggle counter 306 has reached the specified toggle count, the flow proceeds to a step 810, where certain outputs 120 of the DPP 102 are simultaneously toggled in the manner specified by the instruction. The flow then returns to the steps 802 and 804 where the next program instruction is fetched and decoded.

If, at the step 806, it is determined that the fetched instruction is not a toggle instruction, then the routine proceeds to a step 812, where the instruction is carried out to as to control the program flow in the manner specified. Examples of the manner in which particular toggle instructions and program flow instructions may be configured and carried out in various embodiments are described below. Accordingly, using the configuration and functionality illustrated in FIGS. 3 and 8, the toggle counter 306 and a custom toggle instruction set (described below) may be used to keep the DPP 102 in lock step execution. Advantageously, in the example shown, the flow is capable of toggling all output pins on any given clock cycle. In some embodiments, a single instruction may be defined for toggling all of the bits.

The toggle counter 306 may be reset, for example, by explicitly writing to the STIMER register (see Table 1 above) or by using the "(C)" option with a toggle instruction, as described below. By using the "(C)" option, the toggle counter 306 may be cleared before the instruction is executed. For example, in some embodiments, executing the instruction shown below may cause the toggle counter 306 to be reset and the pins V1 and V2 to toggle immediately:

TOGGLE_VECTOR (0: V1, V2) (C);

The counter's maximum count value may, for example, be "65535." When the counter reaches its maximum value, the counter may wrap around and start counting from zero. When this occurs, the sticky wraparound flag may be raised in the DPP status register, DPPSTATUS. To help in program debugging, if the STIMER value is less than the toggle value programmed in the toggle instruction, the sticky skipped-vector status flag may be set in the DPP status register.

Synchronous Timer Configuration Registers

The DPP synchronous timer 306 may, for example, have two registers with direct control over the toggle matching: STIMER and STIMER_MAX (see Table 1 above). In addition, in some embodiments, the counter 306 may also be stopped and started by writing to the DPPSTANDBY register. The STIMER register may, for example, represent the free running clock cycle counter and may be incremented on every rising edge of the clock as long as the enable bit for the counter, STIMEREN, is set in the DPPSTANDBY register. The STIMER register may, for example, be written to explicitly using a load immediate instruction, a load MMR instruction, a POP instruction, or an externally generated write transaction. The register may also be cleared, for example, by using the "(C)" option in one of the toggle instructions.

The STIMER_MAX register may, for example, control the wraparound value of the toggle counter 306. The default may be for the toggle counter 306 to wraparound when it reaches 0xFFFF, for example. In some embodiments, by programming this value, the maximum value of the toggle counter 306 may be modified, thus shortening maximum count in certain applications.

Interrupt Controller

The interrupt controller 104 of the DPP 102 may manage the execution and priority of interrupts and exceptions. An "interrupt" is an event that changes normal processor instruction flow and is asynchronous to program flow. The DPP interrupt controller 104 may, for example, support up to sixteen independent interrupt service routines. In some embodiments, the main components of the interrupt control system may, for example, include the following:

Interrupt Vector Table: Comprising a set of sixteen sixteen-bit program pointers, one for each interrupt.
ILAT: Latches all interrupt events regardless of masking
IMASK: Allows for user controller masking of interrupts
PMASK: Keeps track of interrupt service routine execution in case of nested interrupts.
RETI: Hardware registers that stores the next sequential PC whenever an interrupt service routine starts executing RTI Instruction: Together with RETI, provides a method for returning to the PC executed before the interrupt happened.

Figure 9:
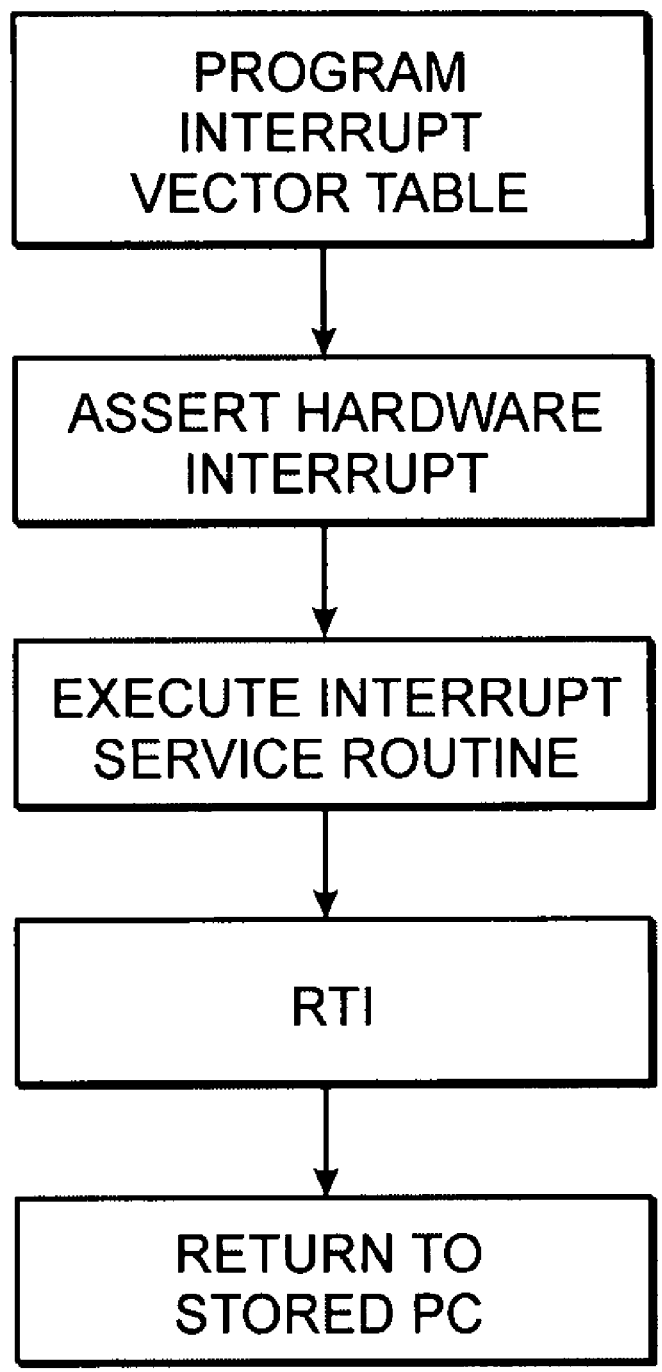
FIG. 9 illustrates an example of basic steps that may be involved in executing an interrupt service routine (ISR) using the DPP.

FIG. 9 illustrates an example of basic steps that may be involved in executing an interrupt service routine (ISR) using the DPP 102.

The event system may be nested and prioritized. Consequently, several service routines may be active at any time, and a lower priority event may be pre-empted by one of higher priority. The processor may, for example, employ a two-level event control mechanism. In embodiments with sixteen interrupt sources, for instance, a certain number, e.g., twelve, may be generic interrupts defined at the chip level, and four may be DPP hardware interrupt vectors as shown below:

IRQ0→Hardware debugging interrupt
IRQ1→Software Exception
IRQ3-2→Reserved
IRQ15:4→Generic Interrupts Configured on a per product basis In some embodiments, the two lowest priority interrupts (IRQ14 and IRQ15) may be reserved for software interrupt handlers, leaving ten prioritized interrupt inputs (IRQ47-IRQ13) for system-level hardware related interrupts.

The interrupt controller 104 may, for example, use three memory-mapped registers (MMRs) and the interrupt vector table (IVT) to coordinate pending event requests. In each of these MMRs, the sixteen bits may correspond to the sixteen separate interrupt levels (for example, bit "0" may correspond to "emulator mode"). In some embodiments, the following registers (see Table 2 above) may, for example, be used:

IMASK→interrupt mask
ILAT→interrupt latch
PMASK→interrupts pending
IRQ{15-0}ADDR→interrupt vector table IMASK Register The interrupt mask register (IMASK) may indicate which interrupt levels are allowed to be taken. As an example, a "1" in a certain bit of the IMASK register may indicate that the corresponding bit in the ILAT register will never be executed as long as the IMASK bit remains "1." If IMASK[N]==0 and ILAT[N]==1, then interrupt N will be taken if a higher priority interrupt is not already recognized. If IMASK[N]==1, and ILAT[N] gets set by interrupt N, the interrupt will not be taken, and ILAT[N] will remain set.

ILAT Register

Each bit in the interrupt latch register (ILAT) may indicate that the corresponding event is latched but not yet accepted into the processor. The bit may be reset before the first instruction in the corresponding ISR is executed. At the point the interrupt is accepted, ILAT[N] may be cleared and PMASK[N] may be set simultaneously. To set and clear bits of the ILAT register, there may, for example, be two registers aliases, ILATSET and ILATCLR. The ILATCLR alias may perform a read-modify-write operation. The new ILAT value may be the ANDNOT function of the old ILAT and the value being written. The ILATSET alias may perform a read modify write operation. The new ILAT value may be the OR function of the old ILAT and the value being written. The ILATSET register may thus be used to generate software interrupt routines, and the ILATCLR register may be used to clear latched interrupts that should be disregarded. There need not be any restrictions on the number of bits set or cleared simultaneously using the ILATCLR and ILATSET register aliases.

PMASK Register

The interrupt pending register (PMASK) may keep track of all currently nested interrupts. Each bit in PMASK may indicate that the corresponding interrupt is currently active or nested at some level. When an event is processed, the corresponding bit in PMASK may be set. The least significant bit in PMASK that is currently set may, for example, indicate the interrupt that is currently being serviced. At any given time, PMASK may hold the current status of all nested events. The PMASK register may, for example, be read by the program but never written.

Interrupt Vector Table

The interrupt vector table (IVT) may, for example, be a hardware table with sixteen entries that are each sixteen bits wide. In some embodiments, the IVT may contain an entry for each possible DPP event. Entries may be accessed as MMRs, and each entry may be programmed at any time after reset with the corresponding vector address for the interrupt service routine. When an event occurs, instruction fetch may start at the address location in the IVT entry for that event. The processor architecture may thus allow unique addresses to be programmed into each of the interrupt vectors; that is, interrupt vectors need not be determined by a fixed offset from an interrupt vector table base address. This approach may minimize latency by not requiring a long jump from the vector table to the actual ISR code.

Nested and Non-Nested Interrupts

In some embodiments, the DPP 102 may support nested as well as non-nested interrupts. Nested interrupts refers to the ability of higher priority interrupts to interrupt the execution of an interrupt service routine in progress. The default operation may be for all interrupts to be non-nesting, meaning that the user has to enable nesting in his or her code for nested interrupts to occur. Nested interrupts may be controlled, for example, by the global interrupt disable bit in the DPPSTATUS register. The global interrupt disable bit may, for instance, disable all interrupts except for the lowest two interrupts, IRQ0 and IRQ1, which may be reserved for hardware debugging and software exceptions and may always be enabled.

The global interrupt disable bit may, for example, be cleared by the following events:

RTI or RDS instruction

Pushing the RETI register onto the stack using the PUSH instruction

A hardware or software reset

The global interrupt disable bit may, for example, be set by the following events:

The execution of an ISR

Popping the RETI register from the stack using the POP instruction

Figure 10:
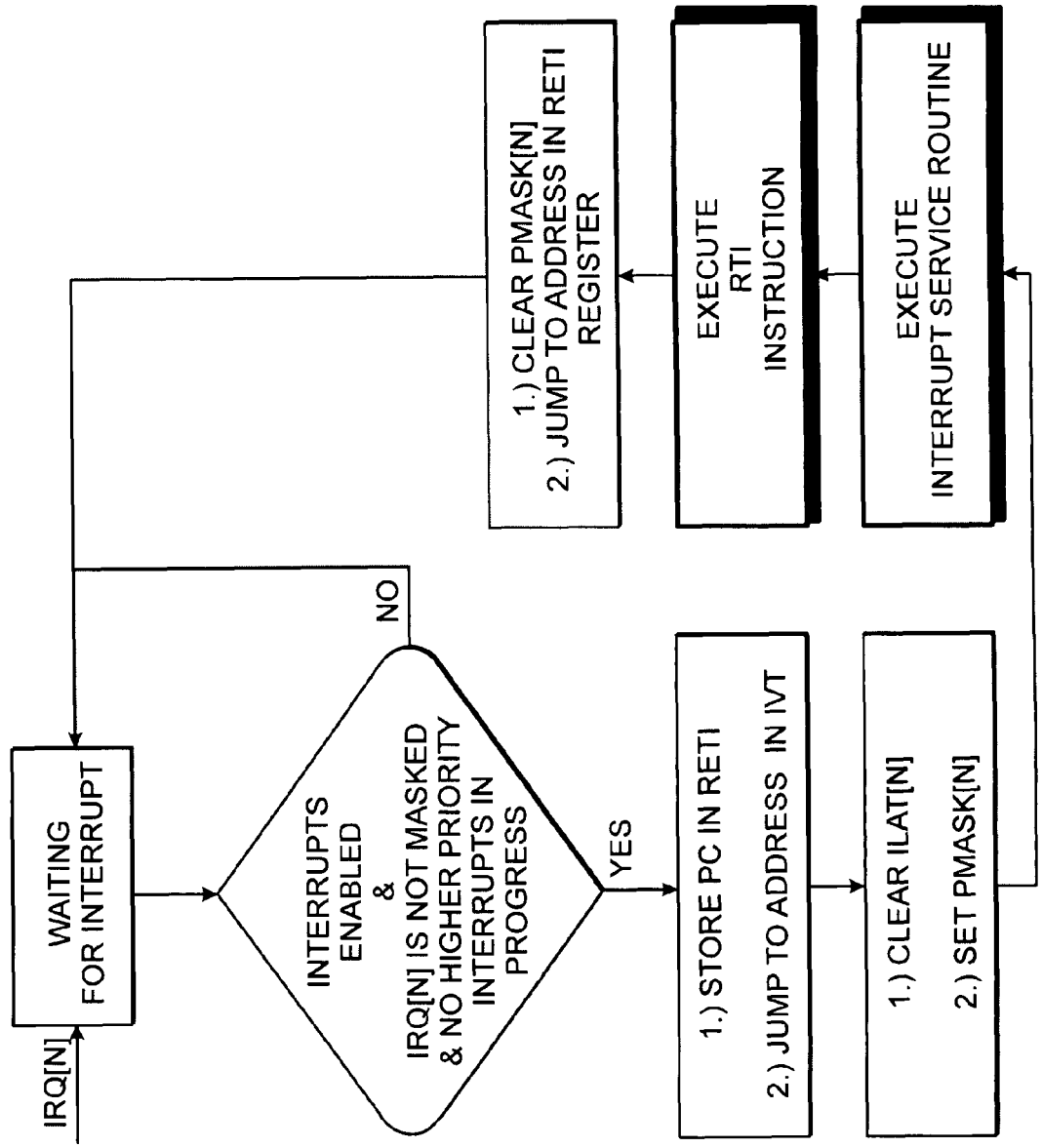
FIGS. 10-11 illustrate examples of how nested and non-nested interrupts, respectively, may be latched and executed in the DPP.
Figure 11:
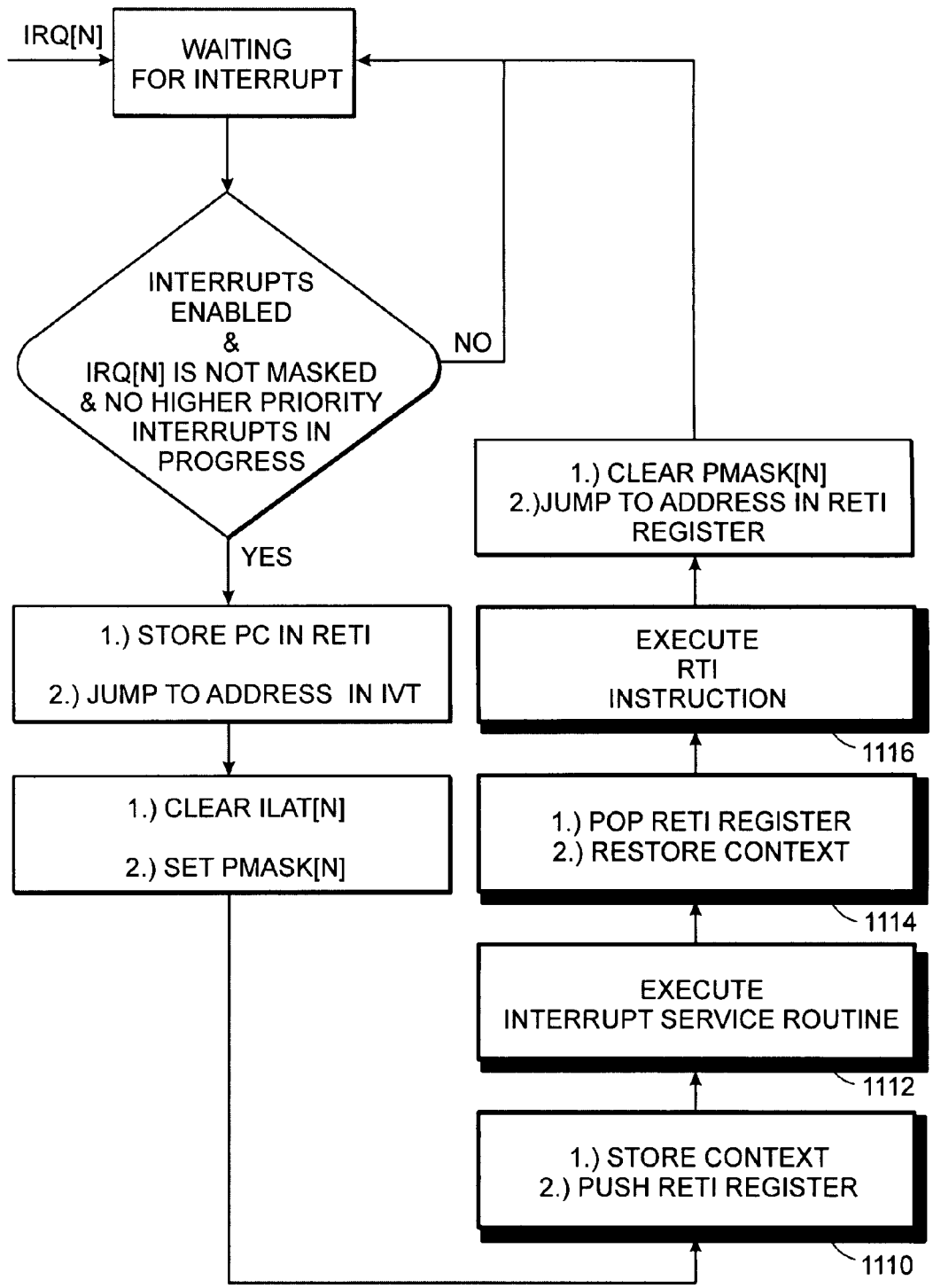

FIGS. 10-11 illustrate examples of how nested and non-nested interrupts, respectively, may be latched and executed in the DPP 102. The shaded boxes indicate steps that may be under user control. All other steps may be automated by the interrupt controller hardware.

In the nested interrupt example of FIG. 11, for example, the user may take care of saving the state of the machine (step 1110), enabling interrupts (step 1112), executing the interrupt service routine (step 1114), and then restoring the previous state from the software stack (step 1116). Storing and restoring context may, for example, be done in the same method as for subroutines.

For interrupt service routines with destructive properties, such as a "reset" event, the saving and restoring of DPP registers may be omitted from the interrupt service routine to improve code latency and code size.

General Purpose Output Controller

In some embodiments, the general purpose output (GPO) controller 116 of the DPP 102 may be decoupled from the timing event generator of the instruction driven DPP, allowing for generation of completely independent events. If, for instance, the DPP 102 is a PC-driven sequentially-executing RISC machine, all timing events may be ordered within the program. If for some reason it is not possible to know the event before the system is deployed, the programming model may break down. An example of this scenario is the programming of timing events that depends on environmental conditions such as temperature and light conditions. In these cases, a parallel execution machine may be employed that allows for programming timing events that are completely independent of all other events in the DPP 102.

Figure 12:
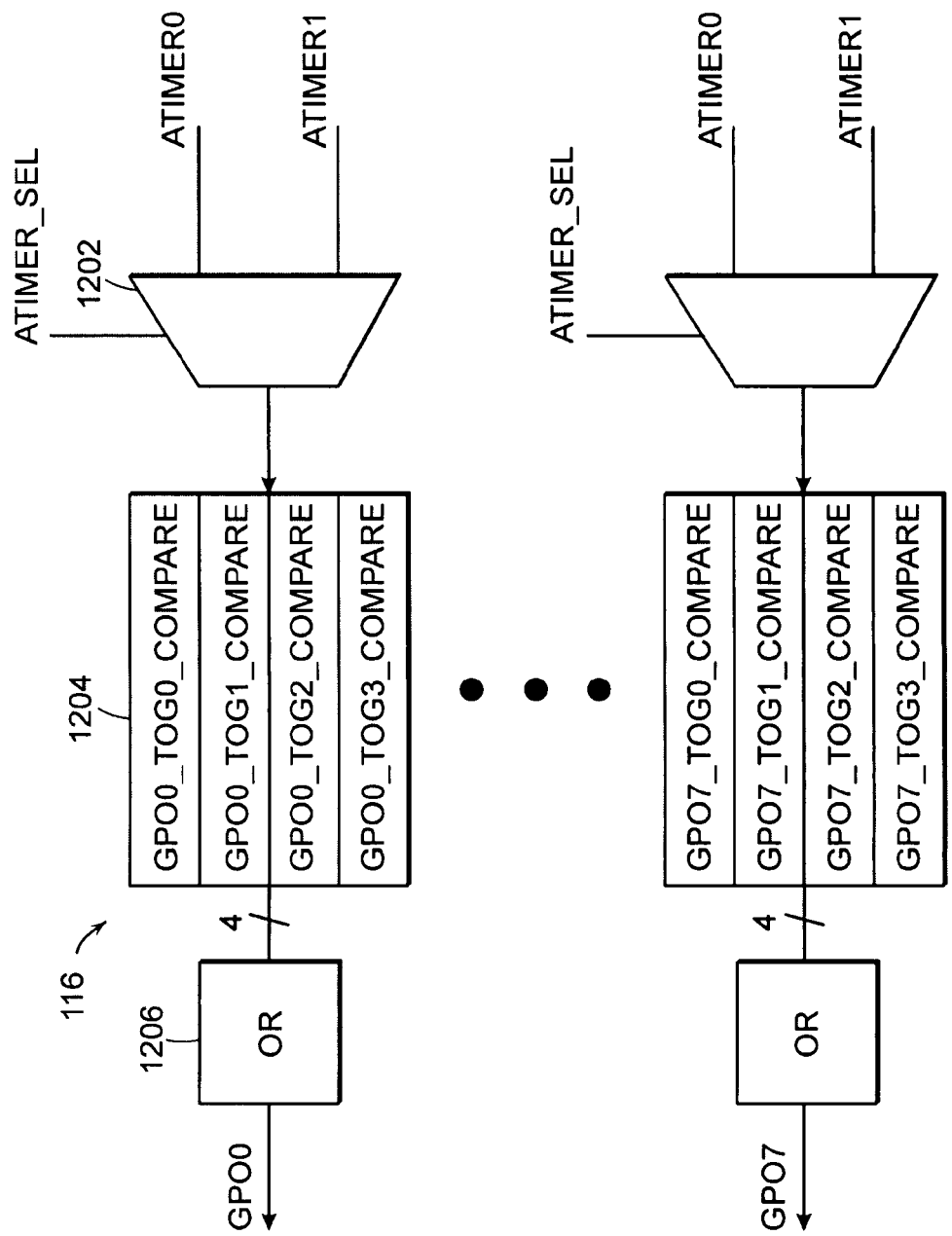
FIG. 12 shows a high-level diagram of an example embodiment of the GPO controller of the DPP.

FIG. 12 shows a high-level diagram of an example embodiment of the GPO controller 116. As shown, the GPO controller 116 may, for example, comprise two thirty two-bit free running clock cycle counters ATIMER0 and ATIMER1 (see Table 4 above) and, for each GPO output (e.g., GPO0), a multiplexer 1202, a cycle count comparator 1204, and a logical OR circuit 1206.

In the example shown, a toggle position memory (or "GPO Toggle Table") associated with the toggle count comparator 1204 contains four thirty-two-bit toggle values. Each one of the toggle value entries may, for example, be enabled by a corresponding bit in an ATIMER_VALID register (discussed below). The toggle values may be compared to either of the two thirty-two-bit counters, ATIMER0 and ATIMER1. As shown, each multiplexer 1202 may control which of the counters is selected, independently for each GPO output, based upon the content of a special select register, ATIMER_SEL. The use of two different thirty-two-bit counters may advantageously allow for the programming of events with independent frequency components or widely different time constants.

The cycle count comparator 1204 associated with each GPO pin may compare the four toggle values to the selected ATIMER counter on every clock cycle to create a toggle match indication. To produce the final match indication for each GPO pin, the logical OR circuit 1206 may OR together the four toggle match indications from each cycle count comparator 1204. Each such indication may, for example, be routed to the respective bit of the OUTREG register 704 (see FIG. 7) to toggle the value currently in the OUTREG register 704, as well as at a corresponding one of the outputs 120 if the OUTENX register 708 is appropriately configured.

GPO Controller Configuration Registers

The GPO controller behavior may, for example, be driven by the following MMRs, programmed as sixteen bit registers using immediate loads, externally driven write transactions, or through load-store transactions. Before any programming can take place, the GPOEN and DPPEN should first be set in the DPPSTANDBY register.

ATIMER0/ATIMER1

These registers may, for example, be thirty-two-bit free running clock cycle counters, updated on the rising edge of the DPP clock. The counters may be enabled by the ATIMER0/ATIMER1 bits in the DPPSTANDBY register. Write and reads to and from the ATIMER0/ATIMER1 registers may be performed using the ATIMER0_LO/ATIMER0_HI and ATIMER1_LO/ATIMER1_HI address aliases. The ATIMER0/ATIMER1 registers may be compared to the toggle selection table on a per-pin basis.

ATIMER0_MAX/ATIMER1_MAX

These thirty-two-bit registers may be set to the maximum count value of the ATIMER counters. The default maximum count value may, for example, be 0xFFFF_FFFF. There may be instances when the maximum toggle value should be shortened, as in the example of programming a repeating event with a certain periodicity. The most efficient method of creating a pin with a period of N may be to set the ATIMER0_MAX or ATIMER1_MAX value to N−1 and to set two of the toggle values of that pin to be less than ATIMER0_MAX/ATIMER1_MAX. Write and reads to and from the ATIMER0_MAX/ATIMER1_MAX registers may be performed using the ATIMER0_MAX_LO/ ATIMER0_MAX_HI and ATIMER1_MAX_LO/ ATIMER1_MAX_HI address aliases.
ATIMER_VALID0/ATIMER_VALID1/ATIMER_VALID2

The ATIMER VALID registers may, for example, be a set of 16-bit registers that control the validity of the toggle entries in the toggle position memory associated with each cycle count comparator 1204. A toggle entry match may, for instance, occur only if the corresponding bit in the ATIMER_VALID registers has been previously set. The bits in the ATIMER_VALID registers may thus control the cycle count comparators 1204 on a per-entry basis. The default reset state may be for all entries to be invalidated. As an example, the mapping of the ATIMER_VALID register may be as follows:

ATIMER_VALID0:
  Bits[3:0] enable toggle entry 0 to 3 for GPO0
  Bits[7:4] enable toggle entry 0 to 3 for GPO1
  Bits[11:8] enable toggle entry 0 to 3 for GPO2
  Bits[15:12] enable toggle entry 0 to 3 for GPO3
ATIMER_VALID1:
  Bits[3:0] enable toggle entry 0 to 3 for GPO4
  Bits[7:4] enable toggle entry 0 to 3 for GPO5
  Bits[11:8] enable toggle entry 0 to 3 for GPO6
  Bits[15:12] enable toggle entry 0 to 3 for GPO7
ATIMER_VALID2:
  Bits[3:0] enable toggle entry 0 to 3 for GPO8
  Bits[7:4] enable toggle entry 0 to 3 for GPO9
  Bits[11:8] enable toggle entry 0 to 3 for GPO10
  Bits[15:12] enable toggle entry 0 to 3 for GPO11

The bits of the ATIMER_VALID registers may be set and cleared like any other MMR, but may also be cleared by a toggle event. If for example, a toggle event occurred for toggle entry 0 on GPO0, bit 0 of ATIMER_VALID0 would be cleared immediately following the event. This means that for the same event to occur again, bit 0 of ATIMER_VALID0 would first have to be set. For repeating events, this valid reset event may be avoided by using the ATIMER_STICKY registers, as explained below.
ATIMER_STICKY0/ATIMER_STICKY1/ATIMER_STICKY2

Figure 13:
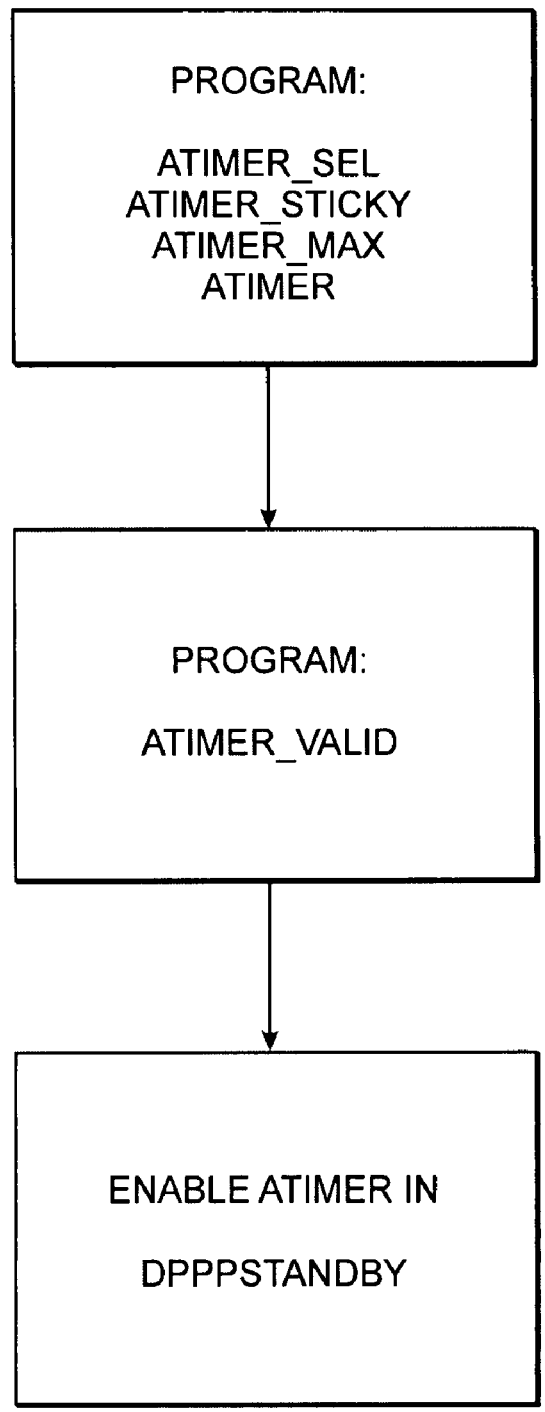
FIG. 13 illustrates an example of a programming sequence that may be used to configure the GPO controller.

The ATIMER STICKY registers may, for example, comprise a set of sixteen-bit registers that control whether the bit in the ATIMER_VALID registers is reset on a toggle entry match event. Setting a bit in the ATIMER_STICKY register may, for instance, guarantee that the corresponding bit in the ATIMER_VALID registers will not be reset on a toggle match event. The default may, for example, be for all toggle entries to be non-sticky. As an example, the mapping of the ATIMER_STICKY registers may be as follows:

ATIMER_STICKY0:
  Bits[3:0] controls sticky toggle entry 0 to 3 for GPO0
  Bits[7:4] controls sticky toggle entry 0 to 3 for GPO1
  Bits[11:8] controls sticky toggle entry 0 to 3 for GPO2
  Bits[15:12] controls sticky toggle entry 0 to 3 for GPO3
ATIMER_STICKY1:
  Bits[3:0] controls sticky toggle entry 0 to 3 for GPO4
  Bits[7:4] controls sticky toggle entry 0 to 3 for GPO5
  Bits[11:8] controls sticky toggle entry 0 to 3 for GPO6
  Bits[15:12] controls sticky toggle entry 0 to 3 for GPO7
ATIMER_STICKY2:
  Bits[3:0] controls sticky toggle entry 0 to 3 for GPO8
  Bits[7:4] controls sticky toggle entry 0 to 3 for GPO9
  Bits[11:8] controls sticky toggle entry 0 to 3 for GPO10
  Bits[15:12] controls sticky toggle entry 0 to 3 for GPO11
ATIMER_SEL This register may select the counter used for toggle comparison on a per-pin basis. For example, a "0" may select ATIMER0 and a "1" may select ATIMER1 for the respective GPO. An example of how ATIMER_SEL bits may be mapped is shown below. By default, all GPOs in the example shown use ATIMER0 for comparison.
[11:0]: GPO11-GPO0
[15:12]: RESERVED An example of a programming sequence that may be used to configure the GPO controller 116 is shown in FIG. 13.

Instruction Set

Examples of four types of instructions that may be executed by the DPP 102 are first presented, without a detailed description, immediately below. These include (1) program flow instructions, (2) load/store instructions, (3) arithmetic instructions, and (4) toggle instructions. Options that may follow each of the foregoing instructions are also presented. A more detailed description of each of the various instructions and options, and several examples of timing generation routines that may be executed using such instructions are presented further below.

The following are examples of "program flow instructions" that may be employed in various embodiments:

```
IF <COND>, JUMP(<IMM16>);
JUMP(<IMM16>);
CALL(<IMM16>);
NOP;
IDLE;
[--RM]=MMR;
MMR=[RM++];
RTS;
RTI;
RDS;
BREAKPOINT;
```

The following are examples of "load/store instructions" that may be employed in various embodiments:

```
MMR=<IMM16>;
[RM+/- {<IMM16 | RN}]=RS;
[RM+/-={<IMM16 | RN}]=RS;
RD=[RM+/- {<IMM16> | RN}];
RD=[RM+/-= {<IMM16> | RN}];
```

The following are examples of "arithmetic instructions" that may be employed in various embodiments:

```
RD=RM +   {<IMM16> | RN};
RD=RM -   {<IMM16> | RN};
RD=RM |   {<IMM16> | RN};
RD=RM &   {<IMM16> | RN};
RD=RM ^   {<IMM16> | RN};
RD=RM >>  {<IMM16> | RN};
RD=RM <<  {<IMM16> | RN};
RD=RM >>> {<IMM16> | RN};
RD=RM <<< {<IMM16> | RN};
```

The following are examples of "toggle instructions" that may be employed in various embodiments:

```
FORCE_VECTOR({<IMM16> | RM}:<VECTOR>);
TOGGLE_VECTOR({<IMM16> | RM}:<VECTOR>);
```

The following are examples of "extended instructions" that may be employed in various embodiments:

```
RD = RM * RN;
RD = RM << RN;
RD += RM * RN;
```

The following are "options" that may be added to the end of any instruction:
(C);
(R);
(S);

Program Flow Instructions

The program flow instructions noted above will now be described in more detail.
Conditional Jump
Syntax:
IF <COND>, JUMP(<IMM16>);
Function: This instruction may change the default sequential program flow to conditionally jump to the location noted in the immediate address field. The jump value may be absolute and allow jumps to anywhere in the program space. In case of jumps to labels, the assembler may take care of substituting the label for the real jump address. The available conditions may be derived from the arithmetic status flags: NEGATIVE and ZERO, which may be updated on every arithmetic instruction. Generally, the arithmetic instruction that creates the condition would be placed immediately before the conditional jump instruction to make sure the arithmetic flags are not overwritten. The conditions that may be evaluated include: EQ (equal to zero), LT (less than zero), and LTE (less than or equal to zero). The "!" option may allow for reversing the polarity of the condition. Together with the subtract and add instructions, these conditions may allow for testing of a large variety of equalities including: ==, !=, >=, <=, >, <.

Examples

```
/*Creating a Loop that executes 10 times*/
R0=10;              //setting counter to 10
LOOP_LABEL:         //start of loop
<code>              //body of loop
R0=R0-1;            //decrementing loop counter, updates ASTATUS
register
If !EQ, JUMP(LOOP_LABEL);//jumping back while loop
/*Check if R0 = R1*/
R2=R1-R0;
If EQ, JUMP(LABEL_B);
<code>
LABEL_B:
/*Check if R0 != R1*/
R2=R1-R0;
If !EQ, JUMP(LABEL_B);
<code>
LABEL_B:
/*Check if R0 > R1*/
R2=R1-R0;
If LT, JUMP(LABEL_B);
<code>
LABEL_B:
/*Check if R0 < R1*/
R2=R1-R0;
If !LTE, JUMP(LABEL_B);
<code>
LABEL_B:
/*Check if R0 >= R1*/
R2=R1-R0;
If LTE, JUMP(LABEL_B);
<code>
LABEL_B:
/*Check if R0 <= R1*/
R2=R1-R0;
If !LT, JUMP(LABEL_B);
<code>
LABEL_B:
JUMP
Syntax:
JUMP(<IMM16>);
JUMP(RM);
```

Function: The JUMP instruction may change the default sequential program flow to allow jumps to any address within the memory space. The jump value may, for example, be specified by a sixteen bit unsigned value, taken either from the immediate field of the instruction or from the RM register specified. There need not be any indication of illegal jumps or jumps to non-initialized program memory. In case of jumps to labels, the assembler may take care of substituting the label for the real jump address.

Examples

```
////////////////////////////////////////////////////////
//An infinite loop
LOOP:
NOP;             //do nothing
JUMP(LOOP);//jump back to LOOP label
////////////////////////////////////////////////////////
//Example of jumping to mode variable
IF !EQ, JUMP(ELSE);  //checking condition
R2=MODE1;            //setting R2 to MODE1 if condition is met
JUMP(EXIT);
ELSE:
R2=MODE0             //setting R2 to MODE0 if condition is not met
EXIT:
JUMP(R2);            //jump to address pointed to by R2
MODE0:
<code>
MODE1:
<code>
////////////////////////////////////////////////////////
SUBROUTINE CALL
Syntax:
CALL(<IMM16>);
CALL(RM);
```

Function: The CALL instruction may, for example, change the default sequential program flow to allow absolute jumps to any address within the memory space. The jump value may, for instance, be specified by a sixteen bit unsigned value, taken either from the immediate field of the instruction or from the RM register specified. In case of jumps to labels, the assembler may take care of substituting the label for the real jump address. Upon executing the CALL instruction, the next sequential program pointer PC may be saved, for example, in the RETS register. The PC value saved in the RETS register may be recalled later by using the RTS instruction. The CALL instruction and the RTS instruction thus form the basis of sub-routine support.

Examples

```
////////////////////////////////////////////////////////////////////////
/////
//EXAMPLE 1: USING CALL(<IMM16>)
CALL(PATTERN_A);        //Jumping to subroutine and saving PC in RETS
register
...
....
//SUBROUTINE
PATTERN_A:
   TOGGLE_VECTOR(0:XV1) (C);//clears the pixel counter and toggles XV1
   TOGGLE_VECTOR(10:XV1) ;   //toggling XV1 at pixel count 10
RTS;                            //jump to address in RETS register
////////////////////////////////////////////////////////////////////////
/////
//EXAMPLE 2: USING CALL(RM)
IF EQ, JUMP(ELSEWHERE);
RM=PATTERN_A;
CALL(RM);                       //Jumping to subroutine and saving PC in RETS
register
...
....
//SUBROUTINE
PATTERN_A:
   TOGGLE_VECTOR(0:XV1) (C);//clears the pixel counter and toggles XV1
   TOGGLE_VECTOR(10:XV1) ;   //toggling XV1 at pixel count 10
RTS;                            //jump to address in RETS register
```

Return to Saved Jump Location
Syntax:
RTS;
Function: This instruction may perform an absolute jump to the last address stored in the RETS register. In some embodiments, it may be assumed that the RETS register was previously written using a CALL statement, and there need not be any warning given for using a RTS statement when no previous CALL statement was issued.

Examples

See subroutine CALL instruction (above).
IDLE
Syntax:
IDLE;
Function: This instruction may place the DPP 102 in an idle mode. In some embodiments, nothing is being executed while the DPP is in this state, and the only way to return from this state is through an externally generated interrupt, from an external pin or through an externally generated software write to the ILAT register. The GPO controller need not be affected by the IDLE instruction, and may keep running uninterrupted. The STIMER register may keep running while the DPP is in the idle state.

Example

```
IMASK=0xFF0F;   /*enabling IRQ4-7 before entering the idle state*/
IDLE;           /*executing an idle instruction*/
NOP
Syntax:
NOP;
```

Function: This instruction need not update any register explicitly, but simply may advance the program pointer to the next sequential program address. The instruction may be used, for example, for padding programs to ensure that certain code sections are always keep the same size.

Example

NOP; /*Do nothing*/
RTI
Syntax:
RTI;
Function: This instruction may return to the address pointed to by the RETI register and notify the interrupt controller that the interrupt routine has completed. The RTI also may reset the bit of the interrupt currently being serviced in the PMASK register.

Example

```
//MAIN CODE
//EXAMPLE OF IRQ4 INTERRUPTING MAIN CODE
TOGGLE_VECTOR(0:XV1) (C);
TOGGLE_VECTOR(10:XV1) ;
...
IRQ4ADDR=ISR_A;    //setting irq address to ISR_A for irq4
ILDE_STATE:
IDLE;              //1.) IRQ3 comes in with main code is waiting
in idle state
                   //2.) the next sequential address is saved in
                   RETI
                   //3.) jump to ISR_A
JUMP(IDLE_STATE);  //jump back to the idle state
<code>
...
ISR_A:
<body of ISR>
RTI;               //1.) Reset the IRQ3 PMASK bit
                   //2.) Jump to the value in the RETI register
```

RDS
Syntax:
RDS;

Function: This instruction may reduce the interrupt service routine to a subroutine, by simply clearing the PMASK bit of the interrupt currently being serviced. The program flow may continue in a linear fashion and need not jump to the RETI register, as in the case of the RTI instruction.

Example

```
//MAIN CODE
//EXAMPLE OF IRQ4 INTERRUPTING MAIN CODE
TOGGLE_VECTOR(0:XV1) (C);
TOGGLE_VECTOR(10:XV1) ;
...
IRQ4ADDR=ISR_A;        //setting irq address to ISR_A for irq4
ILDE_STATE:
IDLE;                  //1.) IRQ3 comes in with main code is waiting
in idle state
                       //2.) the next sequential address is saved in
                       RETI
                       //3.) jump to ISR_A
JUMP(IDLE_STATE);      //jump back to the idle state
<code>
...
ISR_A:
<body of ISR>
RDS;                   //1.) Reset the IRQ3 PMASK bit
<mode code>            //2.) Keep executing next sequential code
```

Breakpoint
Syntax:
BREAKPOINT;
Function: This instruction may halt the execution of the DPP and place the processor in a single step debug state. In the single step debug state, the program pointer may sit in an idle state waiting for the execution of a single step instruction from the debug controller. The difference between the breakpoint instruction and the idle instruction may be that the counters are stopped upon executing the BREAKPOINT instruction and keep running freely after the IDLE instruction.

Example

BREAKPOINT;

Load/Store Instructions

Push
Syntax:
[--RM]=MMR;
Function: The Push instruction may store the contents of the MMR register in the stack location pointed to by RM. The instruction may pre-decrement the Stack Pointer to the next available location in the stack first. The stack may grow down from high memory to low memory. Consequently, the decrement operation may be used for pushing values, and the increment operation may be used for popping values. The Stack Pointer may be defined as any one of the eight general purpose registers R0-R7. Since R0-R7 need not have reset values, the register defined as the stack pointer should be set to the most positive location in the program memory before being used.

Only registers that need to be preserved need to be pushed onto the stack. To reduce program size and improve performance, only essential registers should be pushed onto the stack. All general purpose registers, R0-R7, PC, RETS, RETI, DPPSTATUS, DPPSTANDBY, ASTATUS, STIMER, and STIMER_MAX, may be pushed and popped to and from the stack directly using the push and pop instructions. All other MMRs may first be stored into one of the registers, R0-R7, before the push/pop instruction is executed.

Pushing and popping of the RETI may affect the ability to perform nested interrupts. Pushing RETI may enable nested interrupts, whereas popping RETI may disable nested interrupts. Care should be taken to not push or pop the register used as a stack-pointer since it cannot be retrieved from the stack.

Example

```
/*R1 defined as a stack pointer*/
R1=4096;//defining stack pointer to be one address greater than last
address in memory
//Pushing R0, R2, R3 onto the stack
[--R1]=R0;
[--R1]=R2;
[--R1]=R3;
//Pushing the STIMER onto the stack
[--R1]=STIMER;
//Pushing the ASTATUS register onto the stack
[--R1]=ASTATUS;
POP
Syntax:
MMR = [RM++];
```

Function: This instruction may load the contents of the stack indexed by the current Stack Pointer, RM, into the specified register, MMR. The instruction may post-increment the RM register to the next occupied location in the stack before concluding. The stack may grow down from high memory to low memory, therefore the decrement operation may be used for pushing, and the increment operation may be used for popping values. The user should exercise programming discipline to restore the stack values back to their intended registers from the first-in, last-out structure of the stack. Pop or load exactly the same registers that were pushed onto the stack, but pop them in the opposite order.

Only registers that need to be preserved need to be pushed onto the stack. To reduce program size and improve performance, only essential registers should be pushed onto the stack. All general purpose registers, R0-R7, PC, RETS, RETI, DPPSTATUS, DPPSTANDBY, ASTATUS, STIMER, and STIMER_MAX, may be pushed and popped to and from the stack directly using the push and pop instructions. All other MMRs may first be stored into one of the registers R0-R7 before the push/pop instruction is executed.

Example

```
/*R1 defined as a stack pointer*/
R1=4096;//defining stack pointer to be one address greater than last
address in memory
//Pushing R0, R2, R3 onto the stack
[--R1]=R0;
[--R1]=R2;
[--R1]=R3;
[--R1]=STIMER;
[--R1]=ASTATUS;
/*Popping all registers from stack*/
/*Note that the order is reversed from the push order*/
ASTATUS=[R1++];
STIMER=[R1++];
```

-continued

```
R3=[R1++];
R2=[R1++];
R0=[R1++];
```

Immediate Load
Syntax:
MMR=<IMM>;
Function: This instruction may allow for setting the specified MMR register to a 16-bit constant specified in the instruction line. Any one of the MMR registers may be set in this fashion.

Examples

R0=0xffff;
R0=4096;
IMASK=0x000f;

Arithmetic Instructions

Addition
Syntax:

$RS=RM+RN;$ $RS=RM+<IMM16>;$

Function: This instruction may, for example, perform an addition of the RM and RN registers and place the result in the RS register. The ZERO, NEGATIVE, and OVERFLOW flags of the ASTATUS register may be updated upon completion of the instruction.

Examples $R2=R1+R0;$ $R2=R1+1;$

Subtraction
Syntax:

$RS=RM-RN;$ $RS=RM-<IMM16>;$

Function: This instruction may, for example, perform a subtraction of the RM and {RN|<IMM16>} values and place the result in the RS register. The ZERO, NEGATIVE, and OVERFLOW flags of the ASTATUS register may be updated upon completion of the instruction.

Examples

```
R2 = R1 − R0;
R2 = R1 − 5;
OR
Syntax:
RS = RM | RN;
RS = RM | <IMM16>;
```

Function: This logical instruction may, for example, perform a bitwise OR operation between RM and {RN|<IMM16>} values and place the result in the RS register. The ZERO, NEGATIVE, and OVERFLOW flags of the ASTATUS register may be updated upon completion of the instruction.

Examples

```
R2 = R1 | R0;
R2 = R1 | 0xFF00;    //Setting the upper bits of R2 to 1 and
                     //copying the lower bits of R1 to R2
AND
Syntax:
RS = RM & RN;
RS = RM & <IMM16>;
```

Function: This logical instruction may, for example, perform a bitwise AND operation between RM and {RN|<IMM16>} values and place the result in the RS register. The ZERO, NEGATIVE, and OVERFLOW flags of the ASTATUS register may be updated upon completion of the instruction.

Examples

```
R2 = R1 & R0;
R2 = R1 & 0xFF00;    //Setting the lower bits of R2 to zero and
                     //copying the upper bits of R1 to R2
XOR
Syntax:
RS = RM ^ RN;
RS = RM ^ <IMM16>;
```

Function: This logical instructions may, for example, perform a bitwise XOR operation between the RM and {RN|<IMM16>} values and place the result in the RS register. The ZERO, NEGATIVE, and OVERFLOW flags of the ASTATUS register may be updated upon completion of the instruction.

Examples

```
R2 = R1 ^ R0;
R2 = R1 ^ 0xFF00;    //Setting the lower bits of R2 to R1 and
                     //places the inverted upper bits of R1 in R2
ANDNOT
Syntax:
RS = RM &! RN;
RS = RM &! <IMM16>;
```

Function: This logical instruction may, for example, invert the {RN|<IMM16>} value and then bitwise AND it with the value in the RM register. The result may be placed in the RS register. The instruction may be used to selectively mask part of a register. The ZERO, NEGATIVE, and OVERFLOW flags of the ASTATUS register may be updated upon completion of the instruction.

Examples

```
R2 = R1 &! R0;
R2 = R1 &! 0xFF00;      //Copying the lower bits of R1 to R2 and
                        //clearing the upper bits of R2
LOGICAL RIGHT SHIFT
Syntax:
RS = RM >> RN;
RS = RM >> <IMM16>;
```

Function: The logical right shift instruction may shift the RM value right by the value specified in {RN|<IMM16} and place the result in the RS register. The upper bits of RS may be filled in with zeroes, up to the amount of the RN shift amount. The least significant bits shifted out of the register may be discarded. The ZERO, NEGATIVE, and OVERFLOW flags of the ASTATUS register may be updated upon completion of the instruction.

Examples

```
//Example of register based shift
R1=0xFFFF;
R0=5;
R2=R1 >> R0; //R2 gets 0x07FF;
//Example of immediate shift
R1=0xFFFF;
R2=R1 >> 5;   //R2 gets 0x07FF;
LOGICAL LEFT SHIFT
Syntax:
RS = RM << RN;
RS = RM << <IMM16>;
```

Function: The logical left shift instruction may shift the RM value to the left by the value specified in {RN|<IMM16} and place the result in the RS register. The lower bits of RS may be filled in with zeroes, up to the amount of the RN shift amount. The most significant bits shifted out of the register may be discarded. The ZERO, NEGATIVE, and OVERFLOW flags of the ASTATUS register may be updated upon completion of the instruction.

Example

```
//Example of register based shift
R1=0xFFFF;
R0=5;
R2=R1 >> R0; //R2 gets 0xFFE0;
//Example of immediate shift
R1=0xFFFF;
R2=R1 >> 5;   //R2 gets 0xFFE0;
ARITHMETIC RIGHT SHIFT
Syntax:
RS = RM >>> RN;
RS = RM >>> <IMM16>;
```

Function: The arithmetic right shift instruction may shift the RM value to the right by the value specified in {RN|<IMM16} and place the result in the RS register. The upper bits of RS may be filled in with the most significant bit, Sign Bit, of the RM register up to the amount of the RN shift amount. The least significant bits shifted out of the register may be discarded. The ZERO, NEGATIVE, and OVERFLOW flags of the ASTATUS register may be updated upon completion of the instruction.

Examples

```
//Example of register based shift
R1=0xFFFF;
R0=5;
R2=R1 >>> R0; //R2 gets 0xFFE0;
//Example of immediate shift
R1=0xFFFF;
R2=R1 >>> 5;   //R2 gets 0xFFE0;
ARITHMETIC LEFT SHIFT
Syntax:
RS = RM <<< RN;
RS = RM <<< <IMM16>;
```

Function: The arithmetic left shift instruction may shift the RM value to the left by the value specified in {RN|<IMM16} and place the result in the RS register. The lower bits of RS may be filled in with zeroes, up to the amount of the RN shift amount. The most significant bits shifted out of the register may be discarded. The ZERO, NEGATIVE, and OVERFLOW flags of the ASTATUS register may be updated upon completion of the instruction.

Examples

```
//Example of register based shift
R1=0xFFFF;
R0=5;
R2=R1 >> R0; //R2 gets 0xFFE0;
//Example of immediate shift
R1=0xFFFF;
R2=R1 >> 5;   //R2 gets 0xFFE0;
            Load/Store Instructions
LOAD
Syntax:
RD = [RM + <IMM16>];
RD = [RM + RN];
RD = [RM – <IMM16>];
RD = [RM – RN];
```

Function: The load operation may, for example, load data from the address specified within the brackets and place it in the RD register. The <IMM16> or RN address values may either be added to or subtracted from the RM value to produce the address used for reading data. RM and RN need not be modified by the address addition performed. If R0 is used for RM, then it should be set to zero.

Examples

```
//loading general purpose register with value of stimer
//the RET_STIMER is a predefined macro that specifies a 16-bit address
R0 = 0;
R7 = [R0 + REG_STIMER];
//loading parameter from data portion of memory
R7=[R0+1024];
```

```
//loading parameter from data portion based on a register value
R1=1024;
R7=[R0+R1];
POST-MODIFY LOAD
Syntax:
RD = [RM += <IMM16>];
RD = [RM += RN];
RD = [RM -= <IMM16>];
RD = [RM -= RN];
```

Function: The post-modify load operation may, for example, load data from the address specified within the brackets and place it in the RD register. The address from which to load the data may be set to the value of the RM register. After the data load has completed and the data has been placed in the RD register, the RM register may be updated with the result of the addition or subtraction of RM and RN or RM and <IMM16>. The instruction may thus be used to efficiently load a large buffer of data in the memory to the register file, one item at a time.

Example

```
/////////////////////////////////////////////////////////////////
//Example of using the auto-increment load-store to add
//an offset to an array stored in memory
R0=0x512;      //setting the base pointer of the array
LOOP:
R4=[R0+0];     //loading R4 with value in array
R4=R4+2;       //adding 2 to temporary value
[R0+=1]=R4;    //storing R4 back into array and incrementing the pointer
R4=R0-527;     //running comparing to end of array
IF !EQ, JUMP(LOOP);
STORE
Syntax:
[RM + <IMM16>] = RS;
[RM + RN] = RS;
[RM - <IMM16>] = RS;
[RM - RN] = RS;
```

Function: The store operation may, for example, copy the data from RS into the address location specified within the brackets. The <IMM16> or RN address values may either be added to or subtracted from the RM value to produce the address used for reading data. RM and RN need not be modified by the address addition performed. If R0 is used for RM, then it should be set to zero.

Examples

```
R1=512;
R2=0xAAAA;
R3=7;
[R1 + 5]  = R2;//stores 0xAAAA in memory location 517
[R1 + R3] = R2; //stores 0xAAAA in memory location 519
[R1 - 1]  = R2; //stores 0xAAAA in memory location 511
[R1 - R3] = R2; //stores 0xAAAA in memory location 505
POST-MODIFY STORE
Syntax:
[RM += <IMM16>] = RS;
[RM += RN] = RS;
[RM -= <IMM16>] = RS;
[RM -= RN] = RS;
```

Function: The post-modify load operation may, for example, load data from the address specified and place it in the RD register. The address used for loading the data may be the RM register. After the data load has completed and the data has been placed in the RD register, the RM register may be updated with the result of the addition or subtraction of RM and RN or RM and <IMM16>. The instruction may thus be used to efficiently store a large buffer of data in the memory to the register file, one item at a time.

Example

```
/////////////////////////////////////////////////////////////////
//Example of using the auto-increment load-store to add
//an offset to an array stored in memory
R0=0x512;      //setting the base pointer of the array
LOOP:
R4=[R0+0];     //loading R4 with value in array
R4=R4+2;       //adding 2 to temporary value
[R0+=1]=R4;    //storing R4 back into array and incrementing the pointer
R4=R0-527;     //running comparing to end of array
IF !EQ, JUMP(LOOP);
```

Output Toggle Instructions

Force Vector
Syntax:

```
FORCE_VECTOR (<IMM16>: <VECTOR>) (C);
FORCE_VECTOR (RM: <VECTOR>) (C);
```

Function: This toggle instruction may, for example, cause the PC to stall until the STIMER cycle count reaches the value specified by the RM or <IMM16> field. When a match is reached, all the output pins specified in the <VECTOR> field may be set to "1," and all other vector driven outputs from the DPP may be cleared to "0." The instruction may, for example, be useful for setting starting polarities of the vector driven outputs.

Options:

(C): This option may be used to clear the internal toggle counter before the execution of the instruction.

Examples

```
//In the examples below, a hypothetical processor with 10 output pins,
//XV1 to XV10 is assumed
/////////////////////////////////////////////////////////////////
//Example1-setting XV1 and XV2 while all others are cleared at cycle
//count 50 care should be taken by the programmer that the STIMER
//is less than 50 before the instruction below is executed. If this is the
case, the instruction is skipped.
FORCE_VECTOR (50: XV1, XV2);
/////////////////////////////////////////////////////////////////
//Example2-clearing the STIMER before starting to count
//XV1 and XV2 are set and XV3-XV10 are cleared after 51 clock
cycles.
FORCE_VECTOR(50: XV1, XV2)(C);
/////////////////////////////////////////////////////////////////
//Example3-clearing all outputs after 51 clock cycles.
FORCE_VECTOR(50:)(C);
/////////////////////////////////////////////////////////////////
```

-continued

```
//Example4-using a dynamic register value for toggle match comparison.
//XV1 and XV2 are set and XV3-XV10 are cleared after 51 clock cycles.
R1=50;
FORCE_VECTOR(R1: XV1, XV2)(C);
TOGGLE VECTOR
Syntax:
TOGGLE_VECTOR (<IMM16> : <VECTOR>) (C) (R);
TOGGLE_VECTOR (RM : <VECTOR>) (C) (R);
```

Function: This toggle instruction may, for example, cause the program pointer to stall until the STIMER cycle count reaches the value specified by the RM or <IMM16> field. When a match is reached, all the output pins specified in the <VECTOR> field may be toggled with respect to their previous state. All pins not specified in the <VECTOR> field may be held at their previous state.

Options:

(C): This option may, for example, clear the internal toggle counter before the execution of the instruction.

(R): This option may, for example, specify that that the value specified in the <IMM16> field or RM register is relative to the current STIMER cycle count when the TOGGLE_VECTOR instruction is first executed. For example, if the STIMER was "100" when the instruction is executed and an <IMM16> value of "10" is specified, the outputs toggle at cycle count "110."

Examples

```
//In the examples below, a hypothetical processor with 10 output pins,
//XV1 to XV10 is assumed.
////////////////////////////////////////////////////////////
//Example1-toggling XV1 and XV2 while all other outputs are untouched
//at cycle count 50.
TOGGLE_VECTOR (50: XV1, XV2);
////////////////////////////////////////////////////////////
//Example2-clearing the STIMER before starting to count
//XV1 and XV2 toggle and XV3-XV10 are untouched after 50 clock
cycles.
//It takes one clock cycle for the counter to clear with the clear option.
TOGGLE_VECTOR (50: XV1, XV2)(C);
////////////////////////////////////////////////////////////
//Example3-toggling all outputs when the STIMER reaches 50.
#define ALL_PINS XV1, XV2, XV3, XV4, XV5, XV6, XV7, XV8,
XV9, XV10
TOGGLE_VECTOR (50:ALL_PINS);
////////////////////////////////////////////////////////////
//Example4-waiting until STIMER reaches 50 before continuing with
//program execution. No registers or outputs are modified.
TOGGLE_VECTOR(50:);
////////////////////////////////////////////////////////////
//Example5-relative toggle option
//Waiting for 50 clock cycles relative to the current STIMER before
//toggling outputs XV1 and XV2
TOGGLE_VECTOR(50:XV1,XV2)(R);
////////////////////////////////////////////////////////////
//Example6-using a register as a relative toggle option
//Waiting for 50 clock cycles relative to the current STIMER before
//toggling outputs XV1 and XV2. In this example, RAND_START is a
//16-bit address location in the unified program/data memory that controls
the toggle   //position of XV1 and XV2. The RAND_START parameter
could be    //controlled by an external host or by the
//program itself.
R1=[R0+RAND_START];
TOGGLE_VECTOR (R1:XV1 ,XV2)(R);
```

Options (C): This option may, for example, be added to the end of any instruction to clear the internal toggle counter before the execution of the instruction.

(R): This option may, for example, be added to the end of a TOGGLE_VECTOR instruction to specify that that the value specified in the <IMM16> field or RM register is relative to the current STIMER cycle count when the TOGGLE_VECTOR instruction is first executed. For example, if the STIMER was "100" when the instruction is executed, and an <IMM16> value of "10" is specified, the outputs toggle at cycle count "110."

(S): This option may, for example, be added to the end of any instruction to save the current program pointer in the RET register. It may be used, for instance, with a JUMP instruction to allow the program to return to the saved address following the jump.

Extended Instruction Set

Multiplication
Syntax:

$RS=RM*RN;$

Function: This instruction may, for example, multiply two fractional signed operands, RM and RN, and place the result in RS. The rounding mode may, for example, round to nearest even. The ZERO, NEGATIVE, and OVERFLOW flags of the ASTATUS register may be updated upon completion of the instruction.

Example $R2=R1*R0;$

Multiply-Accumulate
Syntax:

$RS+=RM*RN;$

Function: This instruction may, for example, multiply two fractional signed operands, RM and RN, add the intermediate result to the value in RS, and place the final result in RS. A set of two RS registers may be used for MAC accumulation. The rounding mode may, for example, round to nearest even. The ZERO, NEGATIVE, and OVERFLOW flags of the ASTATUS register may be updated upon completion of the instruction.

Example $R2+=R1*R0;$

LFSR
Syntax:

$RS=RM<<\char`\~RN;$

Function: This instruction may, for example, be used to create a programmable sixteen-bit Linear Feedback Shift Register (LFSR). The RM may hold the previous state of the LFSR and the RN may hold a map of the tap locations for feedback. The RS register may represent the next state of the LFSR. The feedback of the LSFR may be at bit zero of the RS register. The ZERO, NEGATIVE, and OVERFLOW flags of the ASTATUS register may be updated upon completion of the instruction.

Example

R2=R1<<~R0;

Image Sensor Timing Generator Example

As noted above, one application of the DLL 102 described above may be as a timing generator for a image sensor. Examples of environments in which such a timing generator may operate are described in U.S. Pat. No. 6,512,546, U.S. Pat. No. 6,570,615, and U.S. Patent Application Publication No. 2006/0077275 A1, each of which is incorporated herein by reference in its entirety.

FIG. 14 illustrates a set of specialized instructions in the format defined above that may be used for such a purpose. For such instructions, it is assumed that the program sequencer logic 304 (FIG. 3) comprises several loop counters to keep track of local loops during the processing. The program pointer (PC) of the program sequencer 106 may, for example, reset at the falling edge of the vertical synchronization signal (VD), and the starting address may be set at the falling edge of VD by a program pointer (PGMPTR) register. The next line read may be "PC+1" unless a jump is specified. The program counter may halt on toggle statements until the toggle has been completed, and when jumping to a subroutine from the main program, the return address may be saved in a temporary register. Upon using the return statement, an automatic jump may be done to the previous address. All jumps may be done relative to the current PC.

FIG. 15 illustrates an example of a simple program that may be executed using the instructions of FIG. 14 to perform fast vertical clocking of an image sensor. FIG. 16 illustrates an example of another simple program that may be executed using the instructions of FIG. 14 to readout a single line of data from an image sensor. FIG. 17 illustrates an example of a more complex program that may be executed using the instructions of FIG. 14 to read out image sensor data from a full frame with several regions.

FIG. 18 shows an example of a program instruction configuration that may be used in some embodiments of the DPP 102. As shown, the instruction may, for example, comprise fields for an instruction operational code (INST OPCODE) defining the instruction type, a "count" or "address" value (COUNT/ADDRESS) to be used to set the toggle counter or control program flow as discussed above, a vector specifying how output pins are to be toggled in appropriate circumstances (TOGGLE VECTOR), and a bit (CLEAR) specifying when the toggle counter 306 is to be cleared, e.g., using the "(c)" option discussed above. In some embodiments, the INST OPCODE field may, for simplicity, have a fixed width, and the TOGGLE VECTOR and COUNT/ADDRESS fields may be scalable to various vector widths and count/address values, depending on the application.

Figure 19:
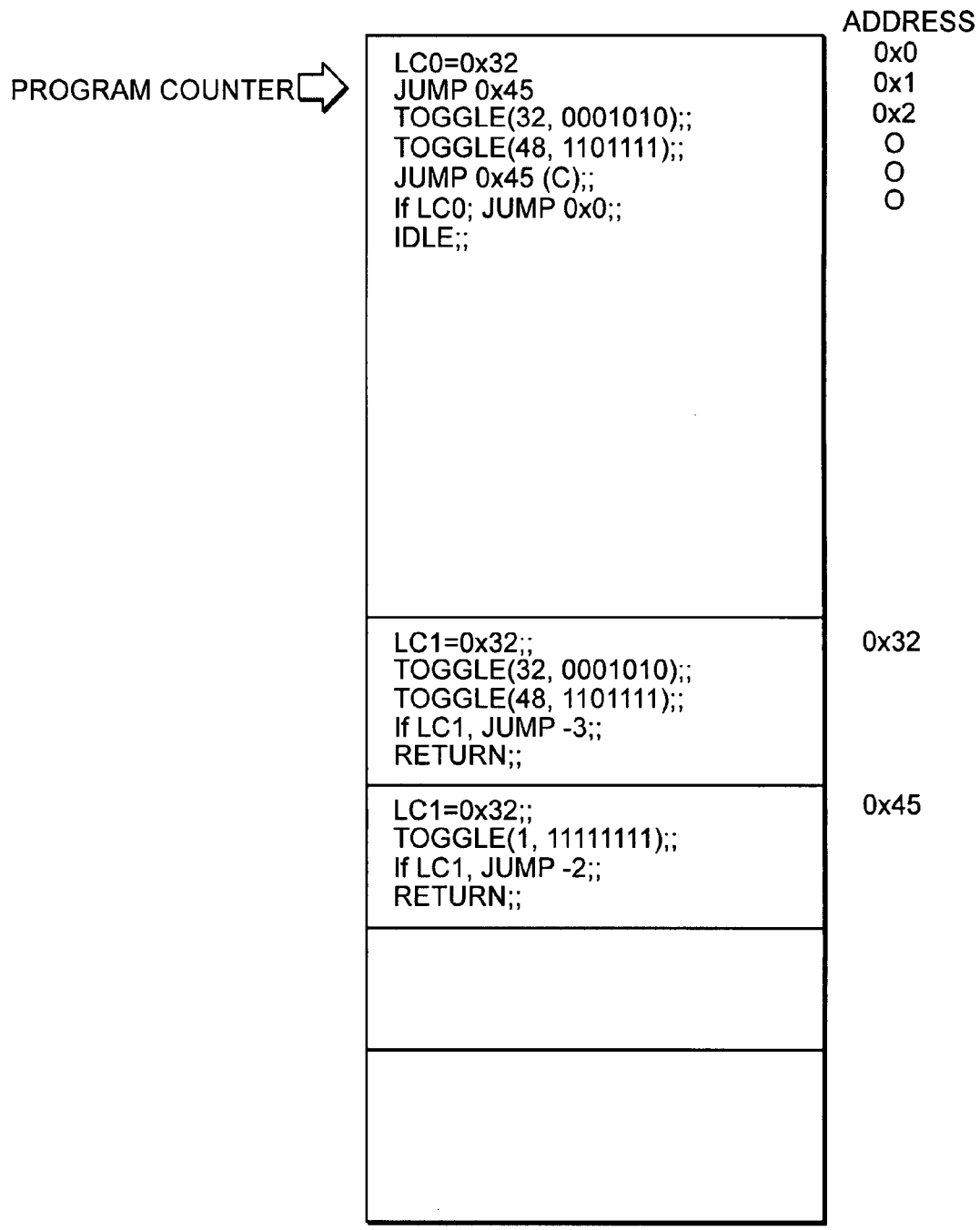
FIG. 19 shows an example of how various instructions may be stored at particular locations in the memory of the DPP, and accessed by a program sequencer, so as to enable certain of the functionality described herein.

FIG. 19 shows an example of how various instructions like those discussed above may be stored at particular locations in the memory 108 of the DPP 102, and accessed by the program sequencer 106, so as to enable certain of the functionality described herein.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A circuit to generate a control signal, comprising:
a first clock cycle counter circuit configured to produce a first output count, the first clock cycle counter comprises:
a first free running clock cycle counter configured to generate a first counter output,
a second free running clock cycle counter configured to generate a second counter output; and
a first multiplexer configured to select one of the first counter output and the second counter output as the first output count based upon a first control signal, the first control signal is independent of the first and second counter outputs;
a memory configured to store simultaneously at least first and second count values; and
a first cycle count comparison circuit configured to compare the first output count with each of the first and second stored count values simultaneously and to generate a particular type of output event corresponding to the control signal at a first node if the first output count corresponds to either of the first and second stored count values.

2. The circuit of claim 1, wherein:
the memory is further configured to store a third count value; and
the first cycle count comparison circuit is further configured to compare the first output count with the third stored count value and to generate the particular type of output event at the first node if the first output count corresponds to the third stored count value.

3. The circuit of claim 1, wherein:
the circuit further comprises a second clock cycle counter circuit configured to produce a second output count;
the memory is configured to store simultaneously at least third and fourth count values with the first and second count values; and
the circuit further comprises a second cycle count comparison circuit configured to compare the second output count with each of the at least third and fourth stored count values simultaneously and to generate the particular type of output event at a second node if the second output count corresponds to either of the third and fourth stored count values.

4. The circuit of claim 3, wherein:
the second clock cycle counter circuit further comprises the first and second clock cycle counters and a second multiplexer configured to select one of the first counter output and the second counter output as the second output count based upon a second control signal.

5. The circuit of claim 4, wherein:
the memory is further configured to store at least fifth and sixth count values;
the first cycle count comparison circuit is further configured to compare the first output count with the fifth stored count value and to generate the particular type of output event at the first node if the first output count corresponds to the fifth stored count value; and
the second cycle count comparison circuit is further configured to compare the second output count with the sixth stored count value and to generate the particular type of output event at the second node if the second output count corresponds to the sixth stored count value.

6. A computer-implemented method to generate a control signal, comprising steps of:
(a) producing, by a processor, a first output count in response to a clock signal by generating first and second different free running counter outputs and selecting one of the first counter output and the second counter output as the first output count based upon a first control signal, the first control signal is independent of the first and second counter outputs;

(b) simultaneously comparing the first output count with each of first and second stored count values; and (c) generating a particular type of output event at a first node corresponding to the control signal if the first output count corresponds to either of first and second stored count values.

7. The method of claim 6, wherein:

the step (b) further comprises comparing the first output count with each of the first, second, and a third stored count values simultaneously; and the step (c) further comprises generating the particular type of output event at the first node if the first output count corresponds to the third stored count value.

8. The method of claim 6, further comprising steps of:

(d) producing a second output count in response to the clock signal;

(e) comparing the second output count with each of the first, second, and at least third and fourth stored count values simultaneously; and (f) generating the particular type of output event at a second node if the second output count corresponds to either of the third and fourth stored count values.

9. The method of claim 8, wherein:

the method further comprises a step of generating first and second different counter outputs;

the step (a) comprises selecting one of the first counter output and the second counter output as the first output count based upon a first control signal; and the step (d) comprises selecting one of the first counter output and the second counter output as the second output count based upon a second control signal.

10. The method of claim 9, wherein:

the step (b) further comprises comparing the first output count with a fifth stored count value;

the step (c) further comprises generating the particular type of output event at the first node if the first output count corresponds to the fifth stored count value;

the step (e) further comprises comparing the second output count with a sixth stored count value; and the step (f) further comprises generating the particular type of output event at the second node if the second output count corresponds to the sixth stored count value.

11. A circuit comprising:

a digital pattern generator configured to generate a pattern of digital signals at M nodes;

a general purpose output controller configured to generate general purpose digital signals at N nodes the controller comprising:

a memory configured to store simultaneously at least first and second count values, and a first cycle count comparison circuit configured to compare the first output count with each of the first and second stored count values simultaneously and to generate a particular type of output event at a first node if the first output count corresponds to either of the first and second stored count values;

at least one first memory element configured to store particular values for M outputs of the circuit corresponding to the M nodes of the digital pattern generator and for N outputs of the circuit corresponding to the N nodes of the general purpose output controller; and a selection circuit configured to select, independently for each of the M outputs of the circuit, whether the particular value stored in the at least one first memory element or the corresponding output signal of the digital pattern generator is provided on that output, and further configured to select, independently for each of the N outputs of the circuit, whether a standby value stored in the at least one first memory element or the corresponding output signal of the general purpose output controller is provided on that output.

12. The circuit of claim 11, wherein the selection circuit comprises a multiplexer comprising:

a first set of M+N inputs coupled to respective ones of the M+N nodes to receive the pattern of digital signals and the general purpose digital signals therefrom;

a second set of M+N inputs coupled to the at least one first memory element to received the stored standby values for the N+M outputs of the circuit therefrom;

N+M multiplexer outputs; and a set of N+M control lines, each of the M+N control lines selecting whether a corresponding one of the first set of M+N inputs or the second set of M+N inputs is provided on a corresponding one of the M+N multiplexer outputs.

13. The circuit of claim 12, wherein the at least one first memory element comprises at least one first read/write register coupled to the first set of M+N inputs of the multiplexer and configured to allow the standby values for the M+N outputs of the circuit to be written thereto, and wherein the circuit further comprises:

at least one second read/write register coupled to the second set of N+M inputs of the multiplexer and configured to allow the pattern of digital signals provided at the M nodes to be written to a first set of the bits thereof and to allow the general purpose digital signals at the N nodes to be written to a second set of bits thereof; and at least one third read/write register coupled to the M+N control lines of the multiplexer and configured to allow corresponding control signals for the multiplexer to be written thereto.

14. The circuit of claim 11, wherein the digital pattern generator comprises:

a memory having stored therein a plurality of instructions that, when executed, cause a digital signal pattern to be generated on a plurality of nodes; and a program sequencer configured to control a sequence in which the plurality of instructions are retrieved from the memory and executed.

15. The circuit of claim 14, wherein the digital pattern generator further comprises:

a first circuit that sequentially steps through a plurality of different output states in response to a clock signal;

a second circuit that identifies an output event when an output state of the first circuit corresponds to an output state identified by retrieved instructions of a particular type; and an event execution unit that controls states of signals on the plurality of nodes in a manner specified by the retrieved instructions of the particular type in response to the second circuit identifying an output event.

* * * * *